United States Patent
Sasaki et al.

[19]

[11] Patent Number: 5,832,398
[45] Date of Patent: Nov. 3, 1998

[54] APPARATUS AND METHOD FOR CONTROLLING DAMPING FORCE CHARACTERISTIC OF VEHICULAR SUSPENSION SYSTEM

[75] Inventors: Mitsuo Sasaki; Katsuya Iwasaki, both of Atsugi, Japan

[73] Assignee: Unisia Jecs Corporation, Atsugi, Japan

[21] Appl. No.: 947,854

[22] Filed: Oct. 9, 1997

Related U.S. Application Data

[62] Division of Ser. No. 541,706, Oct. 10, 1995.

[30] Foreign Application Priority Data

Oct. 12, 1994 [JP] Japan ................................. 6-245951
Nov. 25, 1994 [JP] Japan ................................. 6-291622

[51] Int. Cl.$^6$ ................................. B60G 17/015
[52] U.S. Cl. ................................. 701/37; 280/707
[58] Field of Search ................................. 701/37, 38, 39; 280/707, 840

[56] References Cited

U.S. PATENT DOCUMENTS

| | | | |
|---|---|---|---|
| 5,024,460 | 6/1991 | Hanson et al. | 280/707 |
| 5,235,529 | 8/1993 | Hanson et al. | 701/37 |
| 5,313,390 | 5/1994 | Schramm et al. | 280/707 |
| 5,485,377 | 1/1996 | Sasaki et al. | 280/707 |
| 5,488,556 | 1/1996 | Sasaki et al. | 280/707 |
| 5,515,273 | 5/1996 | Sasaki et al. | 701/37 |
| 5,572,426 | 11/1996 | Sasaki et al. | 280/707 |
| 5,638,275 | 6/1997 | Sasaki et al | 280/707 |
| 5,696,677 | 12/1997 | Leaphart et al. | 701/37 |

FOREIGN PATENT DOCUMENTS

| | | |
|---|---|---|
| 0 659 598 | 6/1995 | European Pat. Off. . |
| 61-163011 | 7/1986 | Japan . |
| 4-63712 | 2/1992 | Japan . |
| 4-502439 | 5/1992 | Japan . |
| 4-191109 | 7/1992 | Japan . |
| 5-50826 | 3/1993 | Japan . |
| 2 260 299 | 4/1993 | United Kingdom . |

OTHER PUBLICATIONS

Patent Abstracts of Japan 04–191109; 07/1992; Morita TAKAO, et al. *Active Suspension for Vehicle.*
Patent Abstracts of Japan 05–319066; 12/1993; Tohata Hideo; *Suspension Control Device.*

*Primary Examiner*—Gary Chin
*Attorney, Agent, or Firm*—Foley & Lardner

[57] ABSTRACT

In apparatus and method for controlling a damping force characteristic of each of front and rear left and right road wheel positioned shock absorbers based on a Sky Hook control theory, rear left and right road wheel position vehicular behaviors are estimated using a predetermined transfer function established between front road wheel position vehicular behaviors and rear road wheel position vehicular behaviors from front left and right road wheel position vehicular behavior related signals with the damping force characteristics of the rear road wheel positioned shock absorbers controlled on the basis of rear road wheel position control signals formed for the rear left and right road wheel positioned shock absorbers on the basis of the estimated rear road wheel position vehicular behaviors.

2 Claims, 24 Drawing Sheets

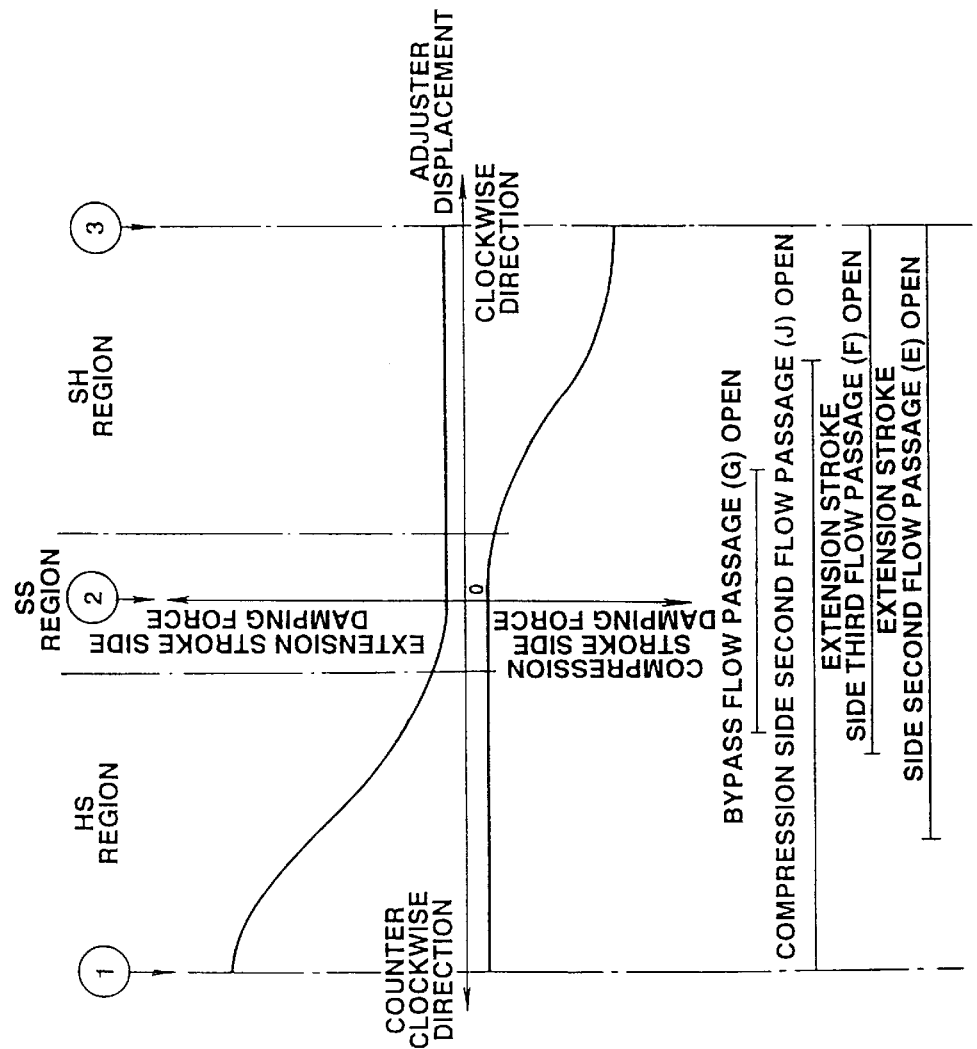

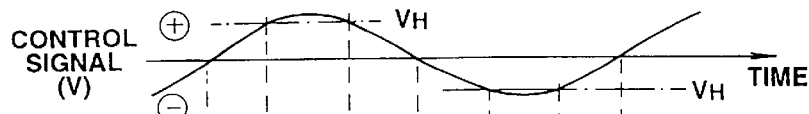
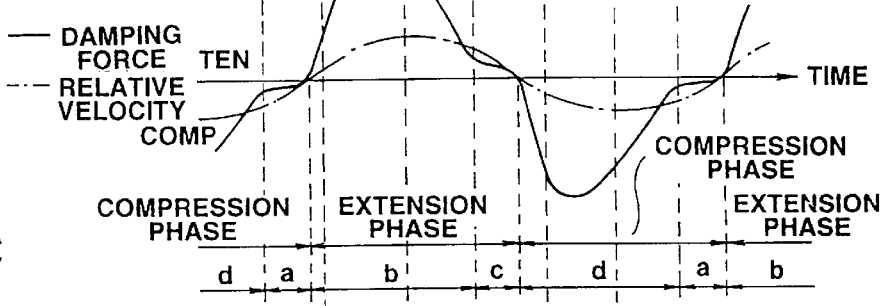
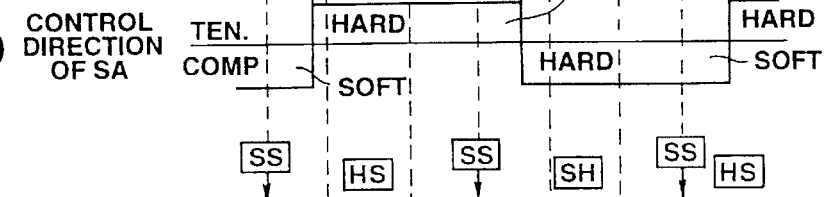
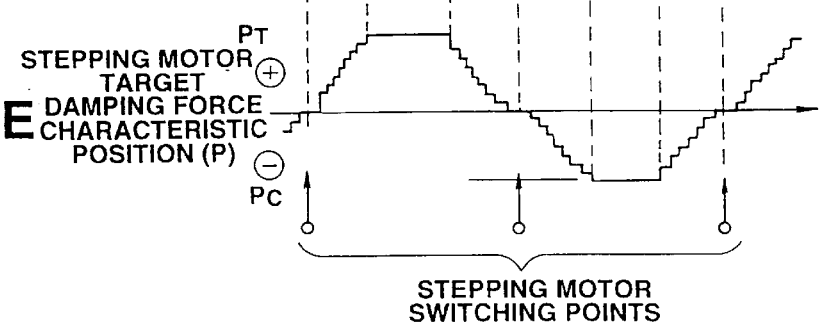

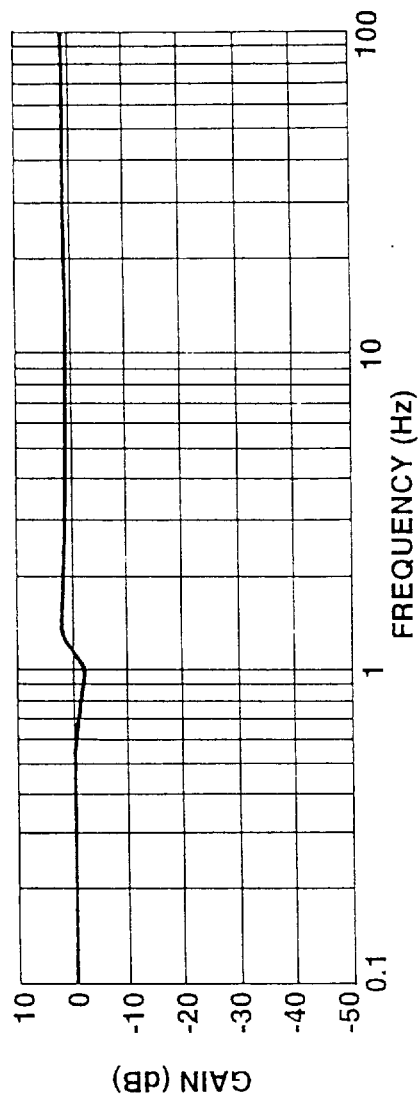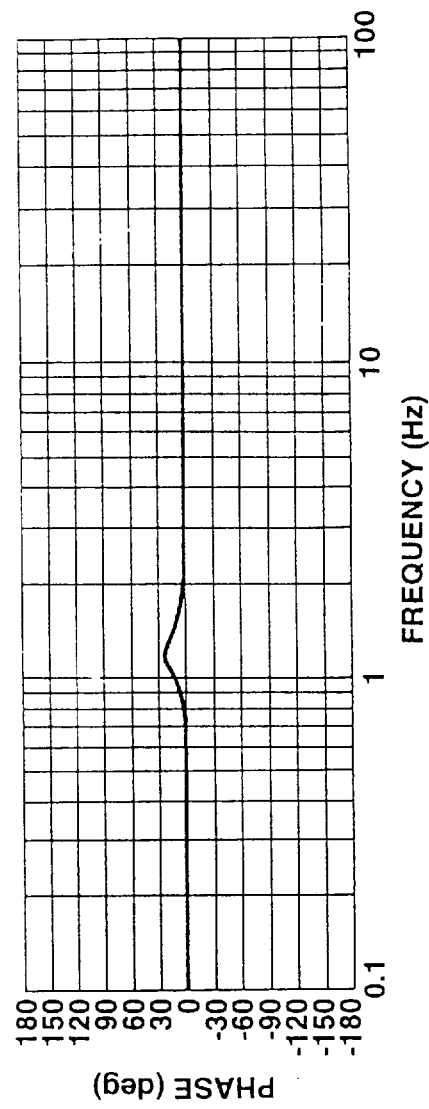
FIG.20A
FIG.20B

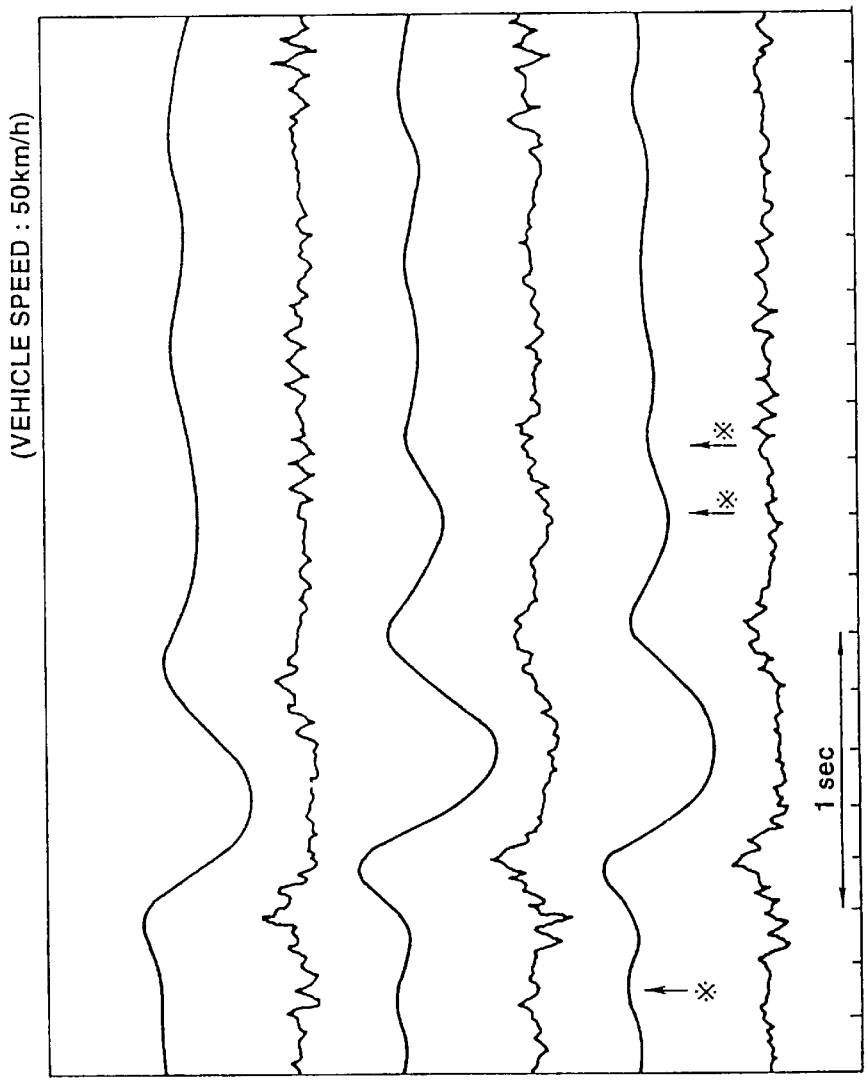

FIG.27E

APPARATUS AND METHOD FOR CONTROLLING DAMPING FORCE CHARACTERISTIC OF VEHICULAR SUSPENSION SYSTEM

This application is a division of application Ser. No. 08/541,706, filed Oct. 10, 1995.

BACKGROUND OF THE INVENTION

1. Field of the Invention

The present invention relates to apparatus and method for optimally controlling a damping force characteristic of a suspension system of an automotive vehicle, the suspension system having four shock absorbers, each shock absorber being interposed between an sprung mass of the vehicle body and an unsprung mass of a corresponding one of front left and right and rear left and right road wheels.

2. Description of Background Art

A Japanese Patent Application First Publication No. Hesei 4-191109 exemplifies a previously proposed suspension system for controlling a damping force of each shock absorber interposed between a sprung mass of a vehicle body and an unsprung mass of a corresponding one of front left and right road wheels and rear left and right road wheels.

The previously proposed suspension system includes: an actuator which is so arranged and constructed between the vehicle body and rear road wheels as to enable to increase and decrease a supporting force of a vehicle body on the rear road wheel; vibration input detecting means for detecting a vibration input from each of the front road wheels due to a passage of the vehicle on a road surface convex and recess; vehicle speed detecting means for detecting a vehicle speed; and controlling means for controlling an operation of the actuator on the basis of the inputs from the respective detecting means.

The controlling means calculates a time point at which the rear road wheels will pass on the same road surface convex and recess which has given the vibration inputs exceeding a predetermined value on the basis of the output vehicle speed of the vehicle speed detecting means when determining that the vibration inputs from the front road wheels have exceeded the predetermined value and is so arranged and constructed as to operate the actuator so that, at that time point, the vibration inputs from the rear road wheels are relieved. That is to say, the previously proposed suspension system carries out a, so-called, preview control such that a timing at which the vibration inputs from the front road wheels are used as correction signals on the respective rear road wheel positioned shock absorbers is delayed (retarded) according to the vehicle speed.

Even if a relatively large vibration is generated on the vehicle body while the vehicle front road wheel(s) have passed the road surface convex and recess, the preview control such as to refer to the vibration input on the vehicle body at the time of the passages of the front road wheels on the road surface convex and recess is carried out when the rear road wheels pass on the same road surface convex and recess. Consequently, when the rear road wheel passes on the same road surface convex and recess, the vibration input on the vehicle body can be reduced as compared with the vibration input on the vehicle body during the passage of the front road wheels on the road surface convex and recess.

In the previously proposed suspension system, sensors used to detect the vibration input are individually and independently installed at the respective road wheel attached positions of the front and rear road wheels.

However, since sensors used to determine sprung mass vertical velocities and relative velocities between the sprung mass and unsprung mass are required to be individually and independently installed at the respective road wheel positions of the front and rear road wheels, its system configuration becomes complex, it is difficult for such sensors as described above to be mounted in the vehicle, and its system structure manufacturing cost becomes accordingly high.

In addition, since sprung mass weights and suspension spring constants are different in the case of the front road wheel side and of the rear road wheel side and sprung mass resonance frequencies are different from each other of those on the front and rear road wheel sides, it is not possible to make accurate estimations of the rear road wheel positioned vehicular behavior only by previewing the vibration input from the front road wheel side to the control of the damping force characteristics in the rear road wheel positioned shock absorbers. Consequently, it is difficult to generate an optimum control force for the rear road wheel positioned shock absorbers.

SUMMARY OF THE INVENTION

It is an object of the present invention to provide apparatus and method for a vehicular suspension system, the suspension system having a plurality of shock absorbers, each of the shock absorbers being interposed between a sprung mass of a vehicle body and an unsprung mass of a corresponding one of front and rear left and right road wheels, which can achieve a simpler and less expensive construction of the apparatus with sensors used to determine vehicular behavior at a left road wheel position omitted, and which can accurately estimate the vehicular behavior at the rear road wheel position so that an optimum control force is exhibited in each of the shock absorbers located at the rear road wheel positions without execution of a, so-called, preview control.

According to one aspect of the present invention, there is provided with an apparatus for a vehicular suspension system, said suspension system having a plurality of front and rear left and right road wheel positioned shock absorbers, each shock absorber being interposed between a sprung mass of a vehicle body and an unsprung mass of a corresponding one of front left and right road wheels and rear left and right road wheels, said apparatus comprising: a) damping force characteristic varying means for operatively varying a damping force characteristic of each corresponding one of the respective shock absorbers; b) front road wheel position vehicular behavior determining means for determining a vehicular behavior at a front road wheel position of the vehicle body and outputting a first signal indicative of the vehicular behavior at the front road wheel position; c) rear road wheel position vehicular behavior estimating means for estimating the vehicular behavior at a rear road wheel position of the vehicle body from said first signal using a predetermined transfer function between a front road wheel position and a rear road wheel position and outputting a second signal indicative of the vehicular behavior at the rear road wheel position of the vehicle body; d) control signal forming means for forming and outputting front road wheel position control signals for the front left and right road wheel positioned shock absorbers on the basis of said first signal and for forming and outputting rear road wheel position control signals for the rear left and right road wheel positioned shock absorbers on the basis of the second signal; and e) damping force characteristic controlling means for controlling the damping force characteristics of the front left and right road wheel positioned shock absorbers on the basis of the front road wheel position control signals via said damping force characteristic varying means and for controlling the damping force characteristics of the rear left and right road wheel positioned shock absorbers on the basis of the rear road wheel position control signals via said damping force characteristic varying means, respectively.

According to another aspect of the present invention, there is provided with an apparatus for controlling a damping force characteristic for each of a plurality of vehicular front and rear left and right road wheel positioned shock absorbers constituting a vehicular suspension system, each of said shock absorbers being interposed between a sprung mass of a vehicle body and an unsprung mass of a corresponding one of front left and right road wheels and rear left and right road wheels, said apparatus comprising: a) detecting means for detecting sprung mass vertical accelerations at front left and right road wheel postions; b) first converting means for converting the detected front left and right road wheel position sprung mass vertical accelerations into corresponding sprung mass vertical velocities at the front left and right road wheel positions, respectively; c) first estimating means for estimating relative velocities between the sprung mass and the unsprung mass at the front left and right road wheel positions from the detected sprung mass vertical accelerations by said detecting means at the front left and right road wheel positions, respectively, using a first predetermined transfer function; d) second estimating means for estimating sprung mass vertical accelerations at rear left and right road wheel positions from the detected sprung mass vertical accelerations at the front left and right road wheel positions, respectively, using a second predetermined transfer function; e) second converting means for converting the sprung mass vertical accelerations at the rear left and right road wheel positions estimated by said second estimating means into the sprung mass vertical velocities at the rear left and right road wheel positions, respectively; f) third estimating means for estimating relative velocities between the sprung mass and the unsprung mass at the rear left and right road wheel positions from the detected sprung mass vertical accelerations at the front left and right road wheel positions, respectively, using a third predetermined transfer function; g) control signal forming means for forming front left and right road wheel position control signals for the front left and right road wheel positioned shock absorbers on the basis of the sprung mass vertical velocities at the front left and right road wheel positions converted by said first converting means and the relative velocities at the front left and right road wheel positions estimated by said first estimating means and for forming rear left and right road wheel position control signals for the rear left and right road wheel positioned shock absorbers on the basis of the sprung mass vertical velocities at the rear left and right road wheel positions converted by said second converting means and the relative velocities at the rear left and right road wheel positions estimated by said third estimating means; and h) damping force characteristic controlling means for controlling the damping force characteristics of the front left and right road wheel positioned shock absorbers on the basis of the front left and right road wheel position control signals formed by said control signal forming means, respectively, and for controlling the damping force characteristics of the rear left and right road wheel positioned shock absorbers on the basis of the rear left and right road wheel position control signals formed by said control signal forming means, respectively.

According to still another aspect of the present invention, there is provided with a method for controlling a damping force characteristic for each of a plurality of vehicular front and rear left and right road wheel positioned shock absorbers constituting a vehicular suspension system, each of said shock absorbers being interposed between a sprung mass of a vehicle body and an unsprung mass of a corresponding one of front left and right road wheels and rear left and right road wheels, said method comprising the steps of: a) detecting sprung mass vertical accelerations at front left and right road wheel positions using front road wheel position sprung mass vertical acceleration detecting means; b) converting the detected front left and right road wheel position sprung mass vertical accelerations into corresponding sprung mass vertical velocities at the front left and right road wheel positions, respectively; c) estimating relative velocities between the sprung mass and the unsprung mass at the front left and right road wheel positions from the detected sprung mass vertical accelerations at the step a) at the front left and right road wheel positions, respectively, using a first predetermined transfer function; d) estimating sprung mass vertical accelerations at rear left and right road wheel positions from the detected sprung mass vertical accelerations at the front left and right road wheel positions, respectively, using a second predetermined transfer function; e) converting the sprung mass vertical accelerations at the rear left and right road wheel positions estimated at the step d) into the sprung mass vertical velocities at the rear left and right road wheel positions; f) estimating relative velocities between the sprung mass and the unsprung mass at the rear left and right road wheel positions from the detected sprung mass vertical accelerations at the front left and right road wheel positions, respectively, using a third predetermined transfer function; g) forming front left and right road wheel position control signals ($V_{FL}$, $V_{FR}$) for the front left and right road wheel positioned shock absorbers on the basis of the sprung mass vertical velocities at the front left and right road wheel positions converted at the step b) and the relative velocities at the front left and right road wheel positions estimated at the step c) and forming rear left and right road wheel position control signals ($V_{RL}$, $V_{RR}$) for the rear left and right road wheel positioned shock absorbers on the basis of the sprung mass vertical velocities at the rear left and right road wheel positions converted at the step e) and the relative velocities at the rear left and right road wheel positions estimated at the step f); and h) controlling the damping force characteristics of the front left and right road wheel positioned shock absorbers $SA_{FL}$ and $SA_{FR}$ on the basis of the front left and right road wheel position control signals ($V_{FL}$, $V_{FR}$) formed at the step g) and controlling the damping force characteristics of the rear left and right road wheel positioned shock absorbers $SA_{RL}$ and $SA_{RR}$ on the basis of the rear left and right road wheel position control signals ($V_{RL}$, $V_{RR}$) formed at the step g).

BRIEF DESCRIPTION OF THE DRAWINGS

FIG. 6 is a damping coefficient characteristic graph representing damping force control regions corresponding to stepped positions of an adjuster installed in the representative shock absorber SA, the adjuster being associated with a stepping motor and being pivoted according to the rotation of the representative pulse (stepping) motor shown in FIGS. 2 and 3.

FIGS. 15A, 15B, 15C, 15D, and 15E are integrally a timing chart indicating a damping force characteristic control operation of the control unit in the first preferred embodiment according to the present invention.

FIGS. 20A and 20B are characteristic graphs of gain and phase characteristics of a transfer function $G_{R(S)}$ from front (left and right) road wheel position sprung mass vertical accelerations up to rear (left and right) road wheel sprung mass vertical velocities in the semi-logarithmic scale, in the case of the first embodiment.

FIGS. 22A, 22B, 22C, 22D, 22E, and 22F are integrally a timing chart indicating actual vehicle running test results as simulations.

FIG. 27A, 27B, 27C, 27D, and 27E are integrally a timing chart indicating the damping force characteristic control operation of the control unit in a fourth embodiment according to the present invention.

BEST MODE CARRYING OUT THE INVENTION

Reference will hereinafter be made to the drawings in order to facilitate a better understanding of the present invention.

(First Embodiment)

Figure 1:
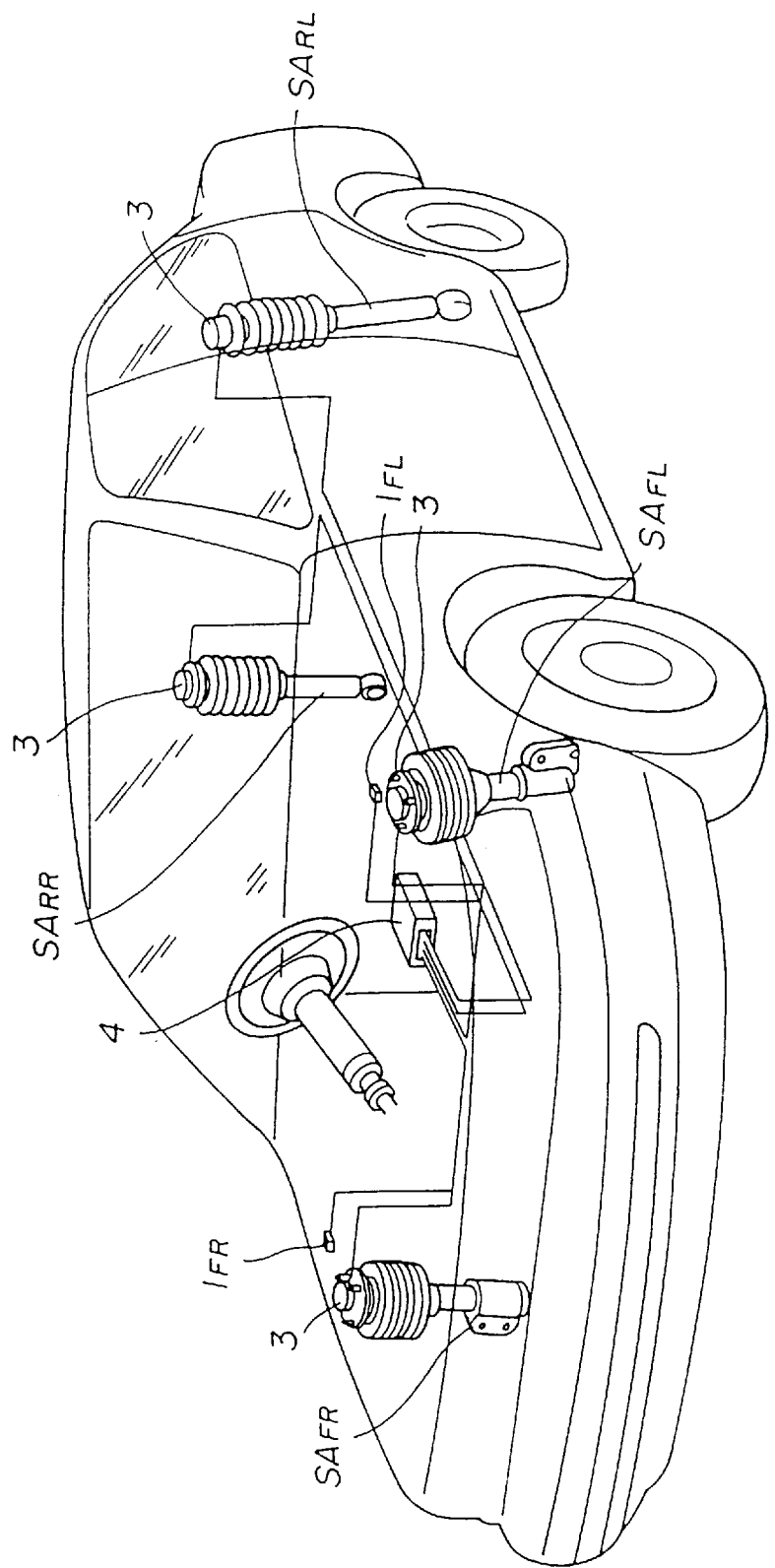
FIG. 1 is an explanatory view of an arrangement of a vehicular suspension system damping force controlling apparatus in a first preferred embodiment according to the present invention.

FIG. 1 shows a whole system configuration of a vehicular suspension system damping force characteristic controlling apparatus in a first preferred embodiment according to the present invention.

Four shock absorbers $SA_{FL}$, $SA_{FR}$, $SA_{RL}$, and $SA_{RR}$ (it is noted that subscripts FL denotes a front left road wheel side (position), FR denotes a front right road wheel side (position), RL denotes a rear left road wheel side (position), RR denotes a rear right road wheel side (position), and a representative shock absorber is simply denoted by SA since all shock absorbers (having the mutually same structures) are interposed between given parts of a vehicular body (sprung mass) and respective road (tire) wheels (unsprung mass). The road wheels comprise front left road wheel, front right road wheel, rear left road wheel, and rear right road wheel of the vehicle. It is noted that the above-described given parts of the vehicular body indicate front left and right road wheel positions and rear left and right road wheel positions.

As shown in FIG. 1, two vertical (.i.e., upward and downward) sprung mass acceleration (G, G; gravity) sensors $1_{FL}$ and $1_{FR}$ are attached onto given parts (also called, tower positions) of the vehicular body adjacent to the front left and right road wheel side shock absorbers SA (namely, $SA_{FL}$ and $SA_{FR}$), each being provided to detect a vertical sprung mass acceleration acted upon the sprung mass (vehicle body). A vehicle speed sensor 2 is provided which detects a vehicle speed of the vehicle.

A control unit 4 is installed at a given part of the vehicle to receive signals derived from the two acceleration sensors $1_{FR}$ and $1_{FL}$ and from the vehicle speed sensor 2, processes these signals, and outputs finally drive signals to respective actuators (,i.e., stepping motors 3) for the respective four shock absorbers SA ($SA_{FR}$, $SA_{FL}$, $SA_{RL}$, and $SA_{RR}$).

Figure 2:
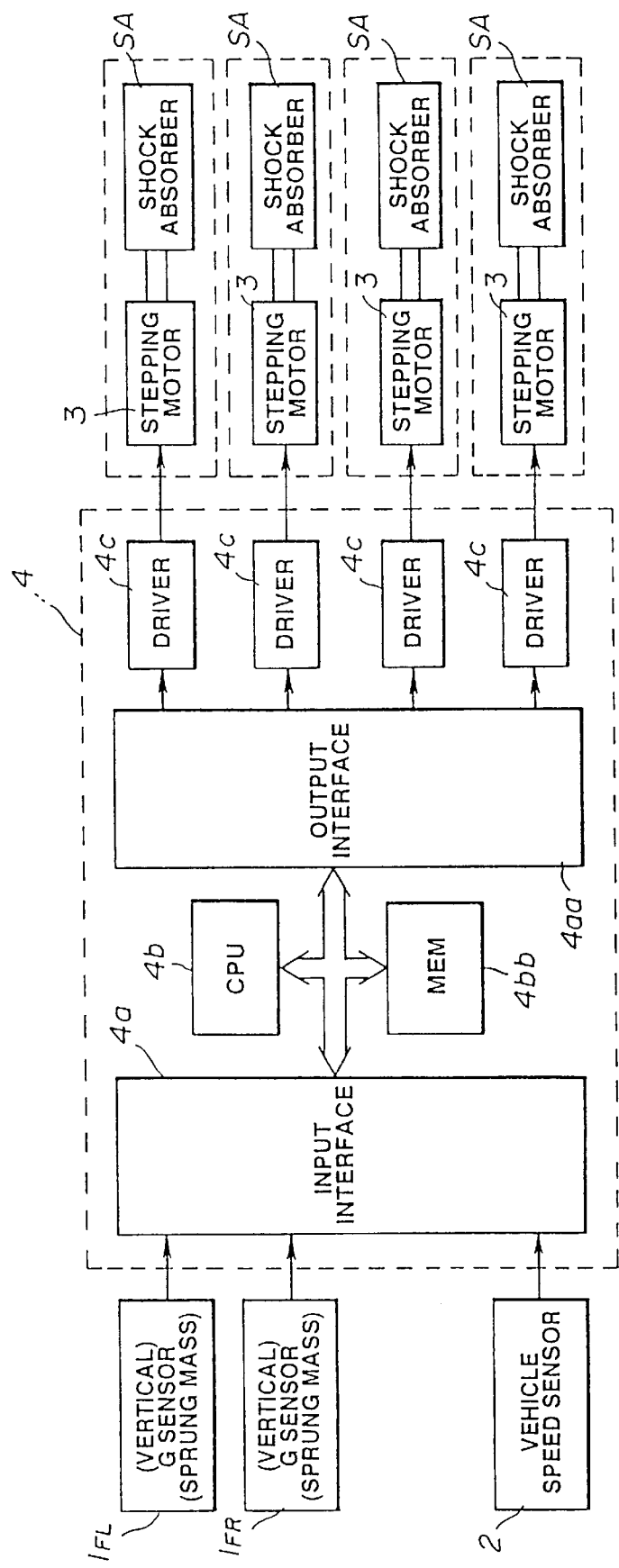
FIG. 2 is a circuit block diagram of a control unit and its peripheral circuits of the vehicular suspension system damping force controlling apparatus shown in FIG. 1.

FIG. 2 shows a circuit block diagram of the vehicular shock absorber damping force controlling apparatus in the first embodiment according to the present invention shown in FIG. 1.

Referring to FIGS. 1 and 2, the control unit 4 is installed on a portion of the vehicular body near to a driver's seat. The control unit 4 includes: an input interface circuit 4a; a CPU (Central Processing Unit) 4b; a memory 4bb having a ROM (Read Only Memory) and a RAM (Random Access Memory); an output interface 4aa, and actuator driver circuits 4c; and a common bus.

It is noted that, in the first embodiment, no stroke sensor used to determine a relative velocity between the sprung mass and the unsprung mass at any of the front and rear road wheel positions is used.

The control unit 4 is provided with the respective drivers 4c connected between the output interface 4aa and the corresponding stepping motors 3.

Figure 13:
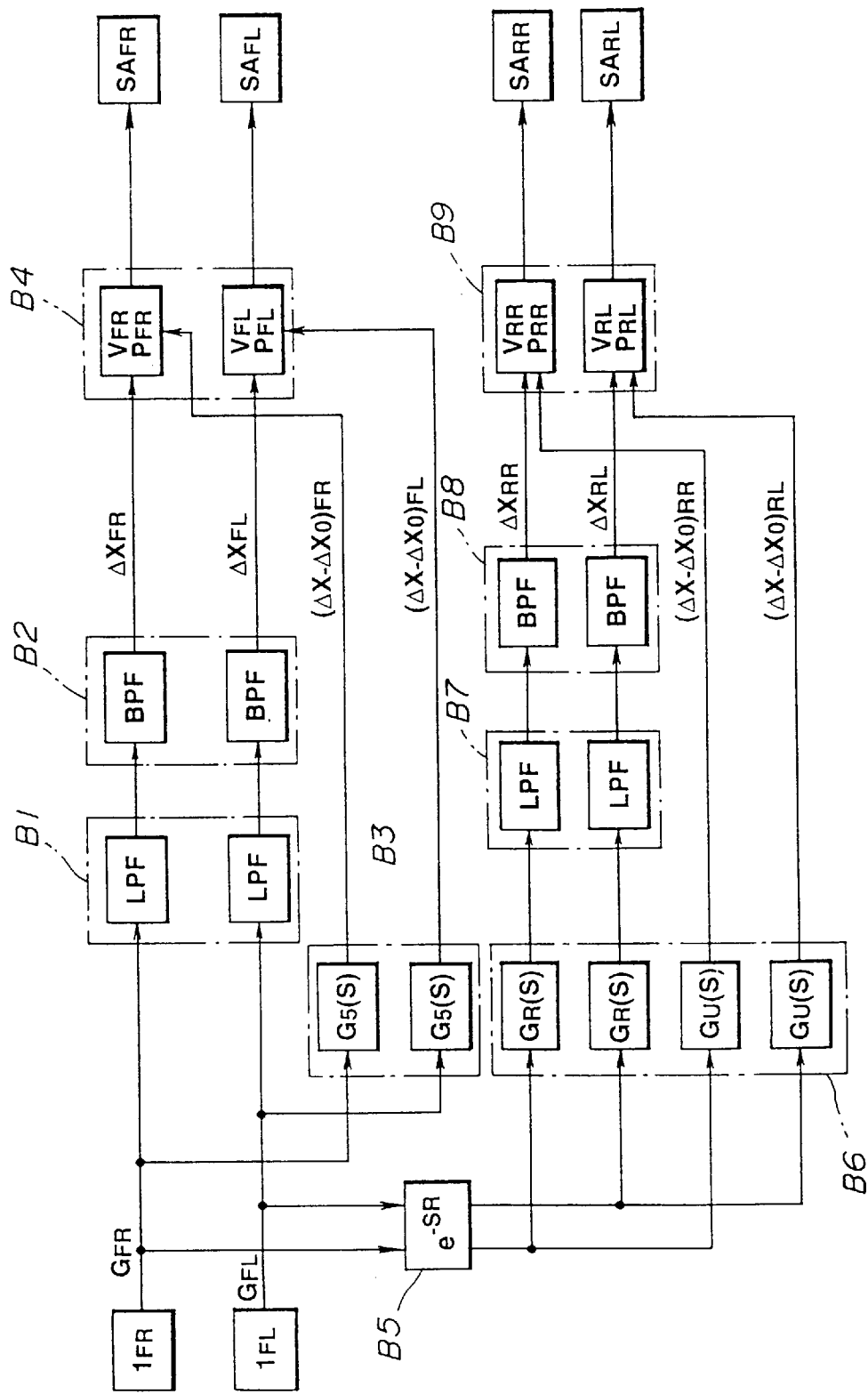
FIG. 13 is a circuit block diagram of a signal processing circuit in the suspension system damping force characteristic controlling apparatus in the first embodiment according to the present invention shown in FIG. 1 used to finally form a control signal V ($V_{FR}$, $V_{FL}$, $V_{RR}$, and $V_{RL}$) and used to finally form a target damping force characteristic position P ($P_{FR}$, $P_{FL}$, $P_{RR}$, and $P_{RL}$) for each of front right and left road wheel positioned and of rear right and left road wheel positioned shock absorber and for each of the front right and left and rear right and left positioned stepping motors, respectively.

The control unit 4 shown in FIG. 2 is provided with a signal processing circuit in terms of its hardware structure as shown in FIG. 13. The signal processing circuit derives each control signal V (including each target damping force characteristic position P) used to perform a damping force characteristic control for each shock absorber SA. The explanation of FIG. 13 will be described later.

Figure 3:
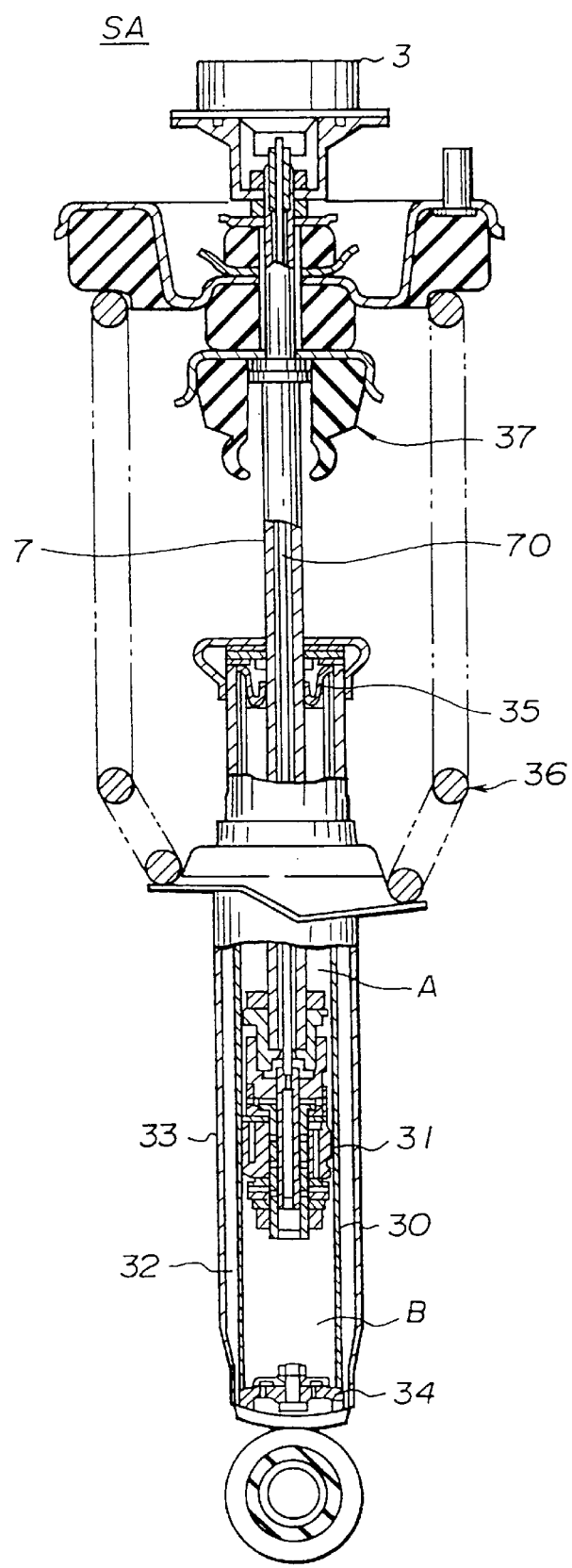
FIG. 3 is a partially sectional view of each shock absorber SA used in the first embodiment shown in FIGS. 1 and 2.

Next, FIG. 3 show a cross sectional view of each shock absorber SA shown in FIGS. 1 and 2.

The shock absorber SA, as shown in FIG. 3, includes: a cylinder 30, a (movable) piston 31 defining an upper portion chamber A and a lower portion chamber B; an outer envelope 33 in which a reservoir chamber 32 is formed on an outer peripheral end of the cylinder 30; a base 34 which defines the lower portion chamber B and the reservoir chamber 32; a guide member 35 which guides a sliding motion of a piston rod 7 with the other end of which the movable piston 31 is linked; a suspension spring 36 interposed between the outer envelope 33 and vehicle body; and a bumper rubber 37.

Each stepping motor 3 shown in FIGS. 1 and 2 is installed in an upper position of the corresponding one of the shock absorbers SA, as shown in FIG. 3, so as to operatively rotate an adjuster 40 (refer to FIG. 4) via a control rod 70 in response to a rotation drive signal from the corresponding one of the actuator drivers (circuits) 4c. A rotating shaft of the corresponding one of the stepping motors 3 is mechanically connected to the corresponding adjuster 40 within each shock absorbers SA via the control rod 70.

Figure 4:
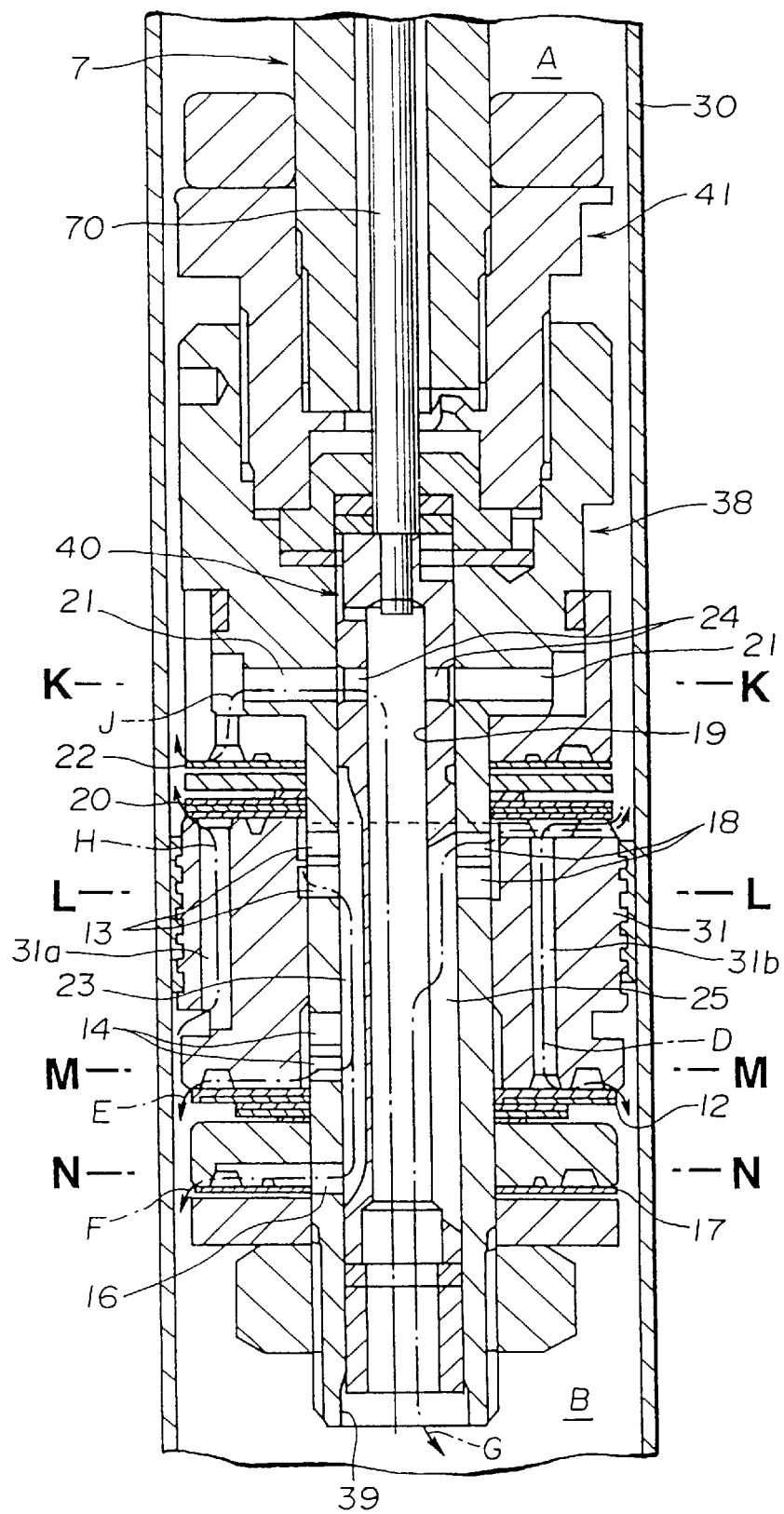
FIG. 4 is an enlarged, partially sectional view of the representative shock absorber SA shown in FIG. 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuating valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate the upper portion chamber A and the lower portion chamber B, the communication hole 39 forming flow passages (an extension phase second flow passage E, extension phase third flow passage F, bypass flow passage G, and compression phase second flow passage J as will be described later). Then, the adjuster 40 which changes flow passage cross sectional areas of the above-described flow passages is provided within the communication hole 39.

Furthermore, an extension stroke side (phase) check valve 17 and a compression (or contraction) stroke side (compression phase) check valve 22 are also installed on an outer periphery of the stud 38, which enable and disable the fluid flow through the above-described flow passages formed by the communication hole 39 in accordance with a direction of the flow of the fluid. As shown in FIG. 3, the adjuster 40 is rotatable by means of the corresponding one of the actuators (stepping motors) 3 via the control rod 70.

It is noted that the stud 38 is formed with a first port 21, a second port 13, a third port 18, a fourth port 14, and fifth port 16, respectively, in an upper order.

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages when the piston stroke indicates the extension phase: that is to say, 1) an extension stroke side (phase) first flow passage D such that the fluid passes the penetrating hole 31b, a valve opened internal side of the extension stroke side (phase) attenuation valve 12, and reaches the lower portion chamber B; 2) an extension stroke side (phase) second flow passage E in which the fluid flows through the second port 13, the longitudinal groove 23, the fourth port 14, a valve opened outer peripheral side of the extension stroke side (phase) attenuation valve 12, and reaches the lower portion chamber B; 3) an extension stroke side (phase) third flow passage F in which the fluid passes through the second port 13, the longitudinal groove 23, and the fifth port 16; and 4) a bypass flow passage G in which the fluid passes through the third port 18, the second lateral hole 25, and the hollow portion 19 and reaches the lower portion chamber B.

In addition, the three fluid flow passages through which the fluid can be caused to flow during the compression stroke side (phase) of the piston 31 include: 1) a compression stroke side (phase) first flow passage H in which the fluid flows through the penetrating hole 31a and valve opened compression stroke side (phase) attenuation valve 20; 2) a compression stroke side (phase) second flow passage J in which the hollow portion 19, the first lateral hole 24, the first port 21, and the opened compression stroke side (phase) check valve 22 and reaches the upper portion chamber A; and 3) the bypass passage G in which the fluid flows through the hollow portion 19, the second lateral hole 25, and the third port 18.

Figure 5:
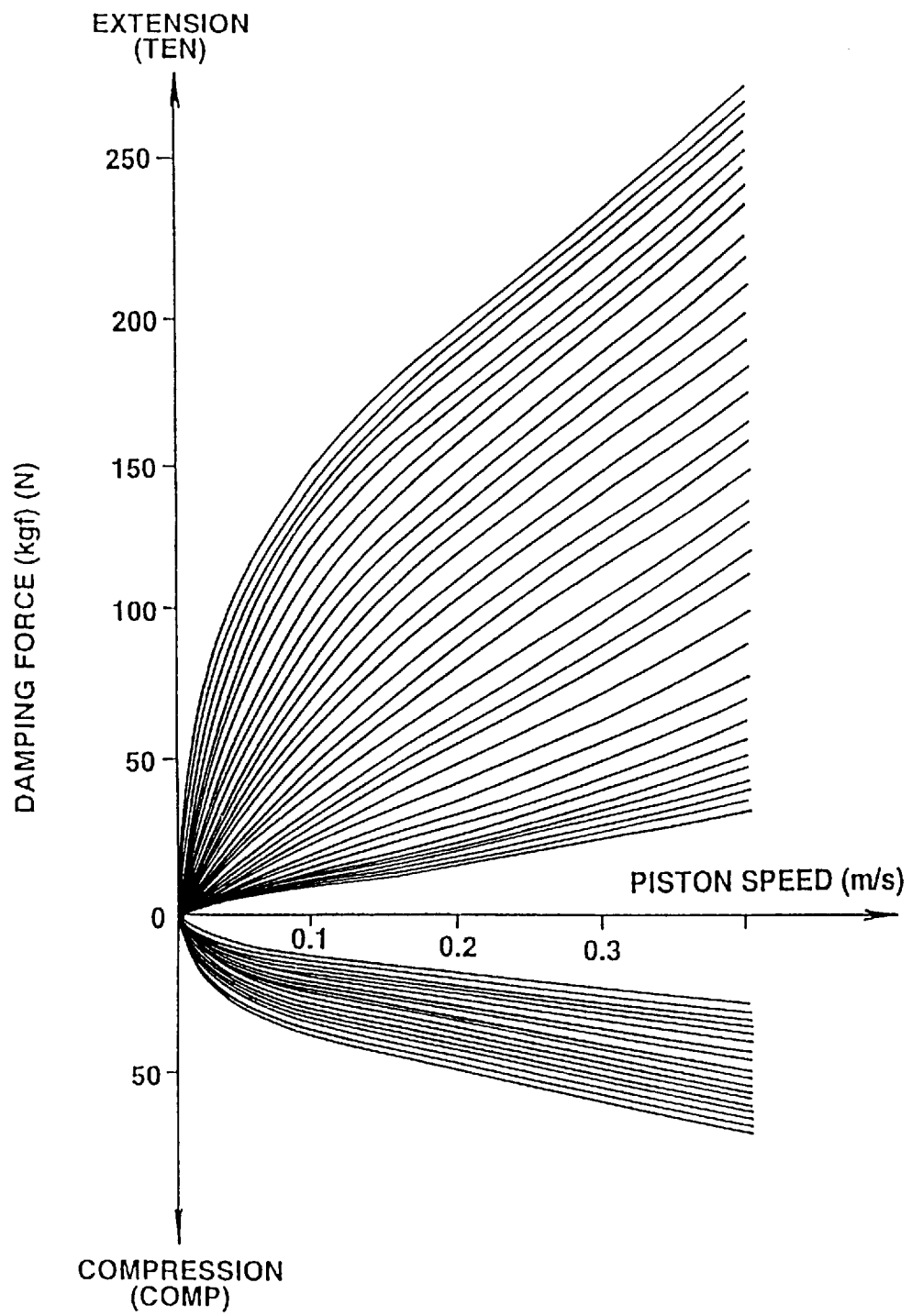
FIG. 5 is a characteristic graph representing damping forces with respect to a piston speed of the representative shock absorber SA shown in FIGS. 3 and 4.

In summary, the shock absorber SA is so arranged and constructed as to be enabled to change the damping force characteristics at a multiple stage in its damping characteristic, as shown in FIG. 5, either in the extension phase or compression phase when the adjuster 40 is pivoted according to the rotation of the corresponding one of the stepping motors 3.

FIG. 6 shows relationships between the rotated position of the adjuster 40 and damping force characteristics at both the extension stroke (phase) and compression phase with respect to the piston 31.

In details, as shown in FIG. 6, when the adjuster 40 is pivoted in a given counterclockwise direction from a generally center position at which both of the extension and compression phases are in soft damping force characteristic positions (hereinafter, referred to as a soft region (soft control mode) SS), the damping force coefficient at the extension stroke side (phase) can be changed at the multiple stage from a maximum hard to a minimum hard characteristic but the compression stroke side is fixed at a soft position (hereinafter, referred to as an extension stroke side (phase) hard region HS). On the contrary, when the adjuster 40 is pivoted in a given clockwise direction therefrom, the damping force coefficient at the compression stroke side (phase) is only changeable to a hard region from the maximum hard to the minimum hard characteristic at the multiple stages and the damping force characteristic at in the compression stroke side is fixed to the soft position (hereinafter, referred to as a compression hard region (compression phase hard) SH).

Figure 7A:
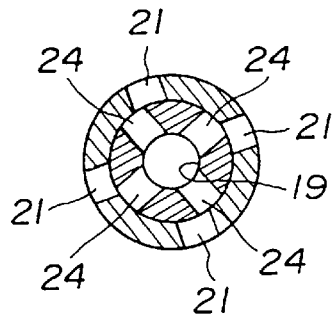
FIGS. 7A, 7B, and 7C are cross sectional views cut away along a line K—K of FIG. 4 representing an essential part of the representative shock absorber shown in FIG. 4.
Figure 7B:
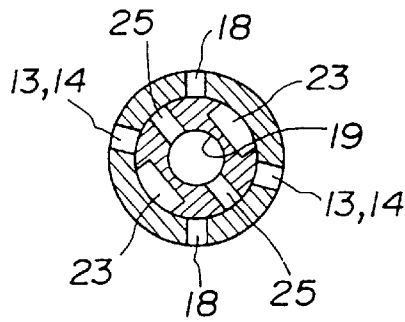
Figure 7C:
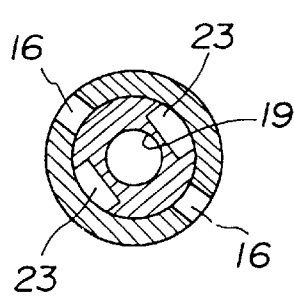
Figure 8A:
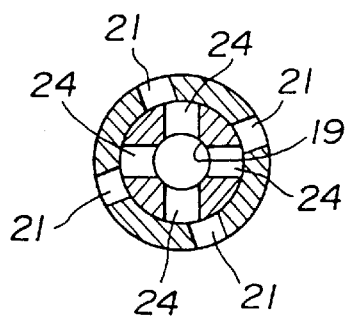
FIGS. 8A, 8B, and 8C are cross sectional views cut away along lines L—L and M—M of FIG. 4 representing an essential part of the representative shock absorber SA shown in FIGS. 3 and 4.
Figure 8B:
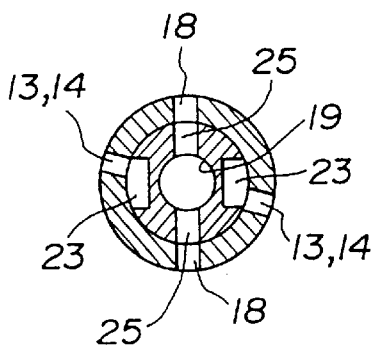
Figure 8C:
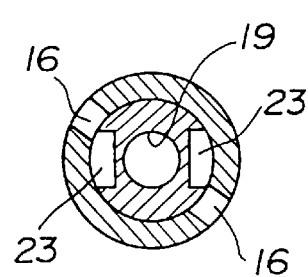
Figure 9A:
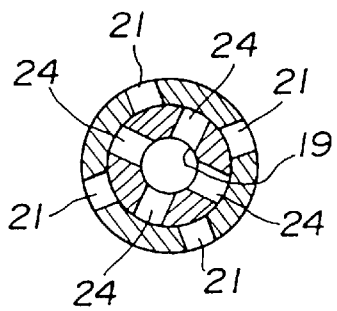
FIGS. 9A, 9B, and 9C are cross sectional views cut away along a line N—N of FIG. 4 representing an essential part of the representative shock absorber shown in FIGS. 3 and 4.
Figure 9B:
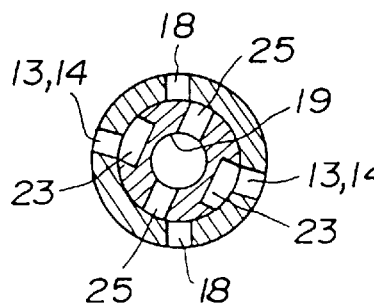
Figure 9C:
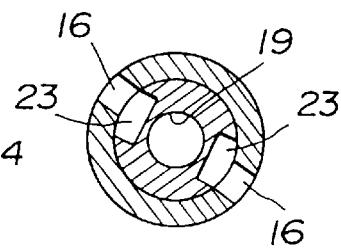

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A (①), 7B (②), and 7C (③) (K—K), 8A (①), 8B (②), and 8C (③) (L—L, M—M), 9A (①), 9B (②), and 9C (③) (N—N), respectively.

Figure 10:
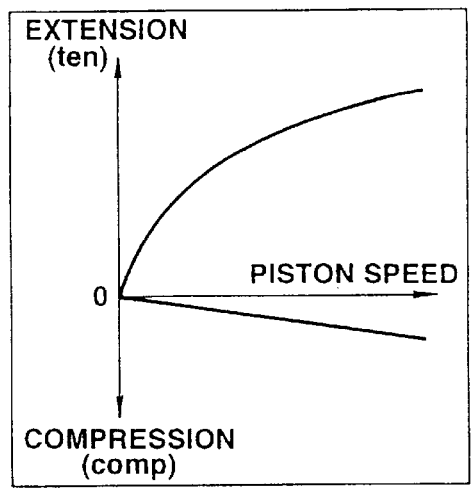
FIG. 10 is a damping force characteristic graph when an extension stroke side (phase) is in a hard (damping force) characteristic with respect to the piston of the representative shock absorber SA shown in FIG. 4 (HS control mode).
Figure 11:
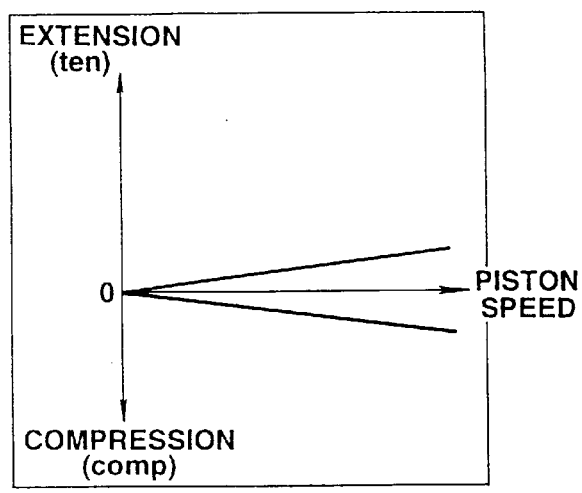
FIG. 11 is a damping force characteristic graph when both extension and compression stroke sides (phases) are in soft damping force states (SS control mode).
Figure 12:
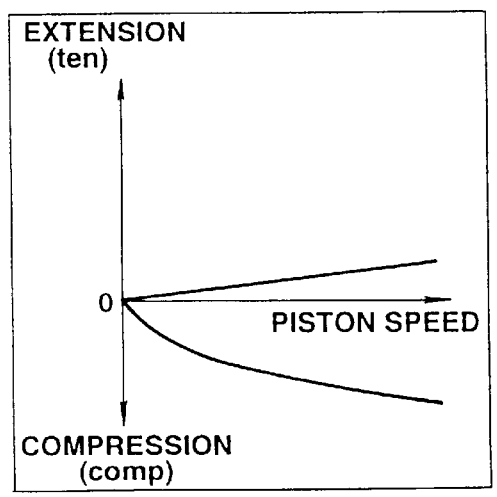
FIG. 12 is a damping force characteristic graph when the compression stroke side (phase) is in a hard damping force state (SH control mode).

The damping force characteristics at the respective positions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Figure 14:
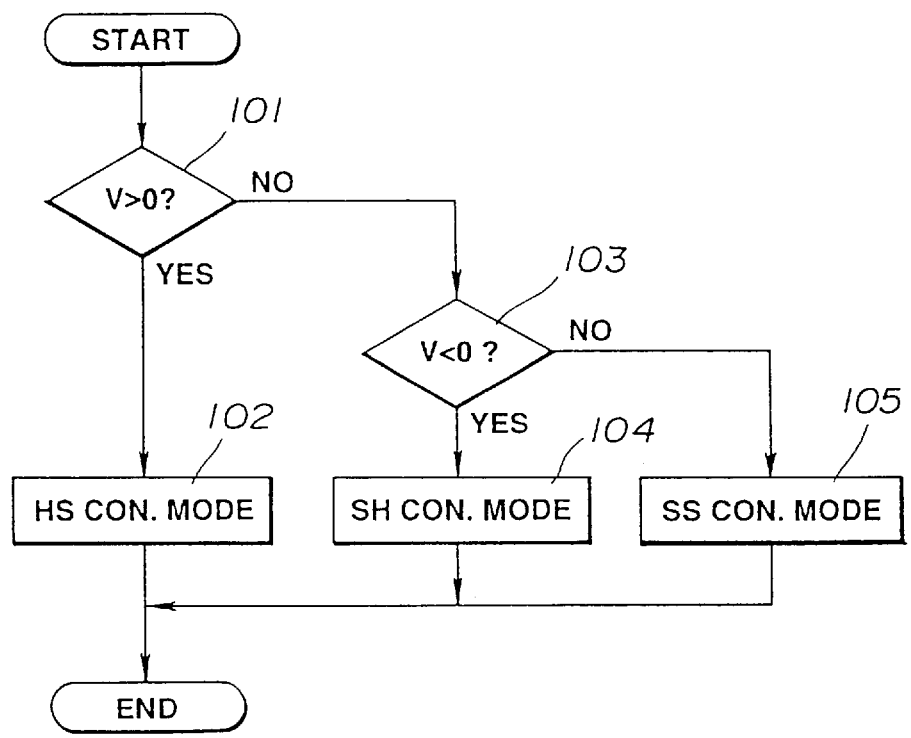
FIG. 14 is an operational flowchart executed in a control unit in the case of the first embodiment according to the present invention.

Next, FIG. 14 shows an operational flowchart for explaining the content of the damping force characteristic control operation for each shock absorber SA executed in the control unit 4.

At a step 101, the CPU 4b determines whether the formed control signal V (for each one of the shock absorbers SA) is increased and exceeds a predetermined positive threshold value $\delta_T$ (it is noted that, in this embodiment, $\delta_T=0$). If Yes at the step 101, the routine goes to a step 102 in which the corresponding one of the shock absorber SA is set to as the extension phase hard region HS.

If NO at the step 101, the routine goes to a step 103 in which the CPU 4b determines whether the control signal V is below a predetermined negative threshold value $-\delta_c$ (it is noted that, in this embodiment $\delta_T=-\delta_c=0$).

If YES at the step 103, the routine goes to a step 104 in which the damping force characteristic of the corresponding one of the shock absorbers SA is set to as the compression phase hard region SH.

If NO at the step 103, the routine goes to a step 105, namely, if the CPU 4b determines that the value of the control signal V gives zero, the corresponding one of the shock absorbers SA is set to as each of the respective extension and compression phases being in the soft region SS.

FIGS. 15A through 15E show integrally a timing chart for explaining the operation of the control unit 4 and shock absorber(s) SA in the case of the first embodiment.

When the control signal V formed on the basis of the sprung mass vertical velocity $\Delta x$ and relative velocity $(\Delta x - \Delta x_0)$ is varied with time as shown in FIG. 15A and the control signal V indicates zero, the corresponding one of the shock absorbers SA is controlled in the soft region SS. That is to say, each shock absorber SA, at this time, is controlled in the SS mode in which both of the extension phase and compression phase exhibit the predetermined fixed low damping force characteristics.

On the other hand, if the magnitude and direction of the control signal V indicates positive, the corresponding one of the shock absorbers SA is controlled so that the extension phase hard region HS is provided and the compression phase is fixed at a predetermined low (soft) damping force characteristic. At this time, the damping force characteristic at the extension phase is increased to provide a target damping force characteristic position $P_T$ in proportion to the magnitude of the control signal V.

If the direction of the control signal V, in turn, indicates negative, the compression phase hard region SH is provided so that the extension phase damping force characteristic is fixed to the low predetermined damping force characteristic and the damping force characteristic at the compression phase is varied to provide a target damping force characteristic position $P_C$ in proportion to the value of the control signal V.

Next, a symbol a of FIG. 15C denotes a region in which the direction of the control signal V formed on the basis of the sprung mass vertical velocity $\Delta x$ and relative velocity $(\Delta x - \Delta x_0)$ is inverted from the negative value (downward) to the positive value (upward).

In the region a, the relative velocity $(\Delta x - \Delta x_0)$ still provides the negative value (the phase of the shock absorber SA is at the compression phase) so that the corresponding shock absorber SA is controlled at the extension phase hard region HS on the basis of the direction of the control signal V and the phase of the corresponding shock absorber SA is at the extension phase. Hence, at this region a, the extension phase from which the piston 31 of the shock absorber SA is moved away provides the hard characteristic which is proportional to the value of the control signal V.

A region b denotes a region in which the direction (direction discriminating sign) of the control signal V is still positive (upward value) and the relative velocity $(\Delta x - \Delta x_0)$ is switched from the negative value to the positive value (the phase with respect to the piston of the corresponding shock absorber SA is the extension phase). At this time, since the shock absorber SA is controlled in the mode of the extension phase hard region HS on the basis of the direction of the control signal V, the stroke direction of the corresponding shock absorber SA is the extension phase. Hence, at the region b, the extension phase side of the shock absorber SA provides the hard characteristic proportional to the value of the control signal V.

A region c denotes a region in which the control signal V is inverted from the positive value (upward) to the negative value (downward) and the relative velocity ($\Delta x - \Delta x_0$) still indicates positive (the phase of the corresponding one of the shock absorbers SA is extension phase). However, at this region c, since the corresponding shock absorber SA is controlled to the compression phase hard region SH on the basis of the direction (direction discriminating sign) of the control signal V, this region c provides the phase (in this region c, the extension phase is provided with the soft (predetermined low damping force) characteristic.

A region d denotes a region in which the control signal V is still at the negative value (downward) and the relative velocity ($\Delta x - \Delta x_0$) is changed from the positive value to the negative value (the phase at which the piston of the corresponding shock absorber SA is at the extension phase side). At this time, since the corresponding shock absorber SA is controlled at the compression phase hard region SH on the basis of the direction of the control signal. Hence, the stroke (phase) of the corresponding shock absorber SA is at the compression phase. In this region d, the compression phase provides the hard characteristic proportional to the value of the control signal V.

As described above with reference to FIGS. 15A through 15E, when the control signal V based on the sprung mass vertical velocity $\Delta x$ and relative velocity ($\Delta x - \Delta x_0$) and the relative velocity of ($\Delta x - \Delta x_0$) have the mutually the same direction discriminating signs (regions b and d), the instantaneous phase at which the piston of the shock absorber SA is moved is controlled at the hard characteristic mode. If the mutual signs thereof (V and ($\Delta x - \Delta x_0$)) are different from each other (regions a and c), the phase, at the time of these regions, at which the piston of the corresponding shock absorber SA is moved, is controlled in the soft characteristic. In the first embodiment, the damping force characteristic control based on the Sky Hook theorem (control theory) is carried out.

In the first embodiment, at a point of time when the phase at which the piston of the corresponding one of the shock absorbers SA is moved is ended, namely, when the region is transferred from the region a to the region b and from the region c to the region d (hard characteristic to the soft characteristic), the dumping force characteristic position $P_T$ or $P_C$ at the phase to which the control is switched has already been switched to the hard characteristic side at the previous regions a and c. Consequently, the switching from the soft characteristic to the hard characteristic has been carried out without delay in time.

Next, FIG. 13 shows the configuration of the signal processing circuit for forming the control signal V and for deriving the target damping force characteristic position P based on the control signal.

Figure 16A:
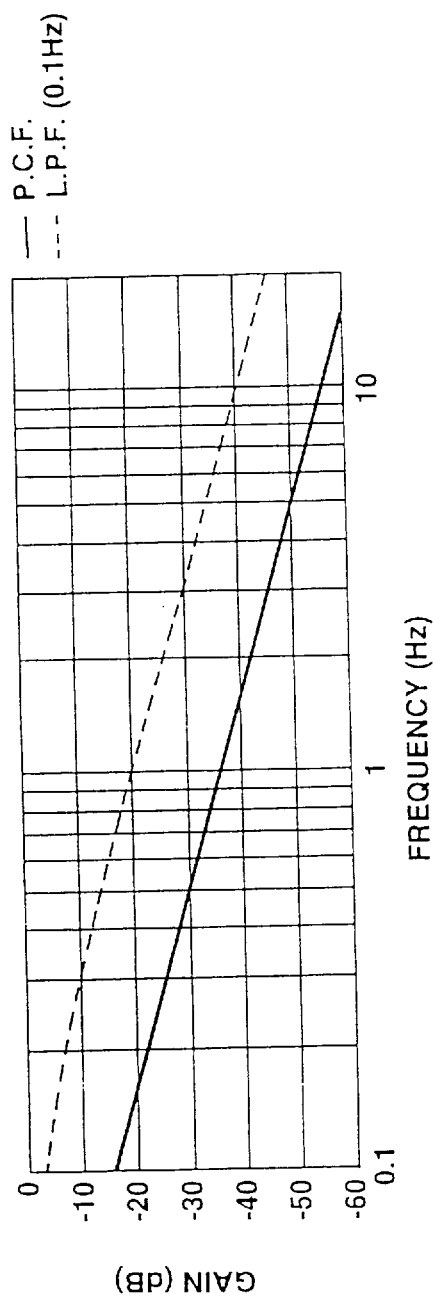
FIGS. 16A and 16B are characteristic graphs of gain and phase characteristics of velocity converting filters in a semi-logarithmic scale (dotted lines denote a first-order low pass filter and solid lines denote a phase compensation filter (PCF) used in the first embodiment shown in FIG. 13.
Figure 16B:
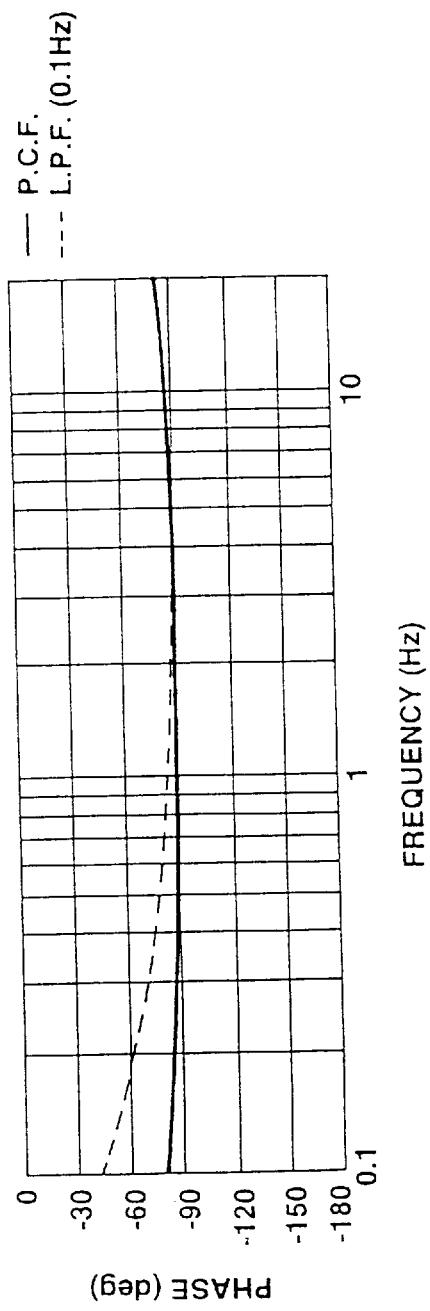

At a block B1, velocity converting filters (including two first-order low pass filters LPF (L.P.F.) (dotted lines of FIGS. 16A and 16B) or two phase compensation filters (PCF, or P.C.F.) in the low pass filter types (solid lines of FIGS. 16A and 16B) are used to convert the sprung mass vertical accelerations $G_{FL}$ and $G_{FR}$ at the front left and right road wheel positioned parts of the vehicle body into corresponding sprung mass vertical velocities at the front left and right road wheel positioned vehicle body. The gain characteristic and phase characteristic of both of each of the firstorder low pass filters LPFs and both of each of the phase compensation filters PCFs are shown in FIGS. 16A and 16B. It is noted that if the phase compensation filters PCFs are used in place of the first-order low pass filters LPFs, the corresponding sprung mass vertical accelerations (G) detected by the sprung mass G sensors $1_{FL}$ and $1_{FR}$ can be converted into the velocity phases in a relatively wide frequency range.

Each phase compensation filter (P.C.F.) which may be used in place of the corresponding one of the two first-order low pass filters in the block B1 of FIG. 13 has the following filter equation: $(0.001S+1)/(10S+1)$; and in a Z transformation equation (using a bilinear transformation equation), $y_{(n)} = [K(2B+T)]/(2A+T) \cdot X_{(n)} - [(K(2B+T)]/(2A+T) \cdot X_{(n-1)} + (2B-T)/(2A+T) \cdot y_{(n-1)}$, wherein $A=10$, $B=0.001$, $K=307$ (gain value), $y_{(n)}$ denotes the output at a time of (n), and $X_{(n)}$ denotes the input at the time of (n). On the other hand, the filter equation of each first-order low pass filter used in the block B1 is expressed as $y(n) = \omega T/(T\omega+2) \cdot (X_{(n)} + X_{(n-1)}) - (T\omega-2)/(T\omega+2) \cdot y_{(n-1)}$, wherein $\omega = 2\pi f$, f denoting a frequency.

Then, at a block B2, the control unit 4 carries out a band pass filtering using two band pass filters (BPFs) in order to cut off the signal components other than a target frequency band to be controlled from the passed sprung mass velocity signals from the first-order low pass filters provided at the block B1. In details, the two band pass filters BPFs at the block B2 extract the front left and right road wheel positioned sprung mass vertical velocities $\Delta x$ ($\Delta x_{FL}$, $\Delta x_{FR}$) at the front road wheel positioned vehicle body with a vehicular sprung mass resonance frequency band as a center of target.

Figure 17A:
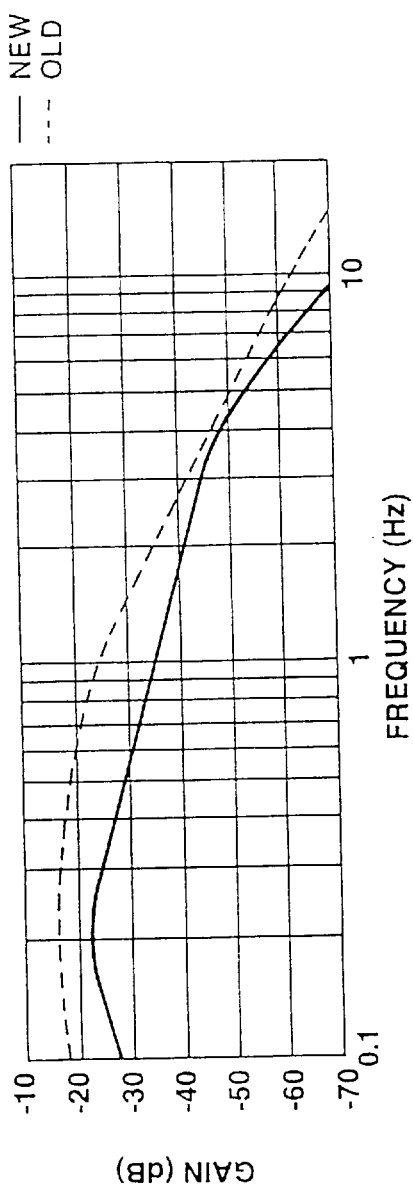
FIGS. 17A and 17B are characteristic graphs of gain and phase characteristics of combinations of the velocity converting filter and an unnecessary component cutting band pass filter (dotted lines denote a combination of a first-order low pass filter LPF and a first-order band pass filter and solid lines denote another combination of the phase compensation filter PCF and a second-order band pass filter) in the semi-logarithmic scale, used in the first embodiment and its alternative, respectively.
Figure 17B:
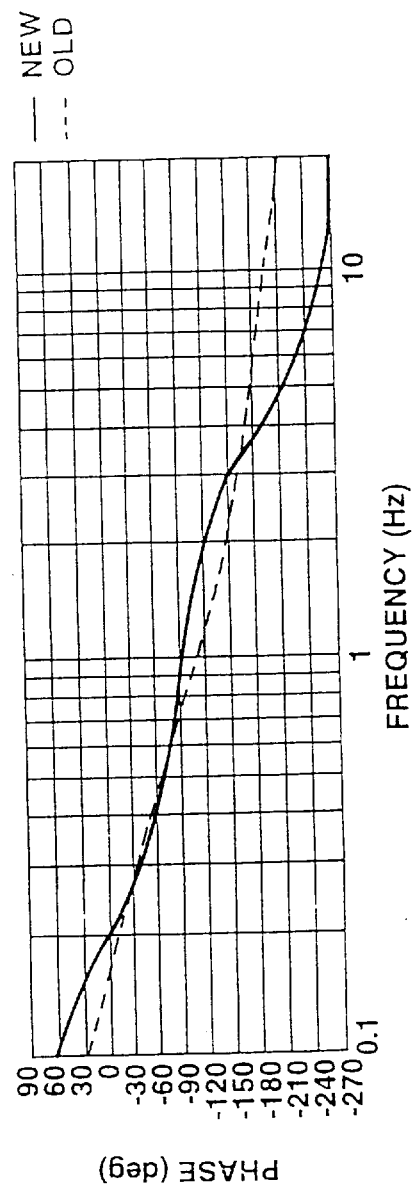

FIGS. 17A and 17B show the gain characteristics (FIG. 17A) and the phase characteristics (FIG. 17B) due to the difference in combinations of the filters at the block B1 and block B2.

The solid lines of FIGS. 17A and 17B denote the gain and phase characteristics when each phase compensation filter PCF and each second-order band pass filter BPF sorely connected to the corresponding one of the phase compensation filter PCF are used as the velocity converting filter and the band pass filter BPF at the blocks B1 and B2 (NEW).

The dotted lines of FIGS. 17A and 17B denote the gain (FIG. 17A) and phase characteristics (FIG. 17B) of the combination of each first-order low pass filter (LPF) and each first-order band pass filter (BPF) (connected in series to the corresponding one of the low pass filters LPFs) which are used for the velocity converting filter at the block B1 and for the band pass filter at the block B2 (OLD).

As appreciated from FIGS. 17A and 17B, the combination of each of the phase compensation filters P.C.F. and each of the second-order band pass filters can have a smaller value of gradient in the phase at the target control frequency band, the target control frequency band corresponding to the sprung mass resonance frequency band as compared with the combination of each of the first-order low pass filters and each of the first-order band pass filters. It is noted that each of the band pass filters at the block B2 may comprise the combination (mutually series connected) of a low pass filter and a high-pass filter.

Next, at a block B3, front road wheel positioned relative velocity signals ($\Delta x - \Delta x_0$) [$(\Delta x - \Delta x_0)_{FL}$, $(\Delta x - \Delta x_0)_{FR}$] at the front left and right road wheel positioned sprung mass and unsprung mass are derived from the front left and right road wheel positioned vertical accelerations $G_{FL}$ and $G_{FR}$, respectively, using the following transfer function $G_{5(S)}$ from the sprung mass vertical accelerations at the front left and right road wheel positions detected by the above-described sprung mass vertical acceleration (G) sensors $1_{FL}$ and $1_{FR}$. The transfer function $G_{5(S)}$ from the sprung mass vertical accelerations at the front left and right road wheel positions to the corresponding relative velocities at the front left and right road wheel positions is expressed as follows:

$$G_{5(S)} = -m_1 S/(c_1 S + k_1). \tag{1}$$

It is noted that S in the equation (1) denotes a Laplace operator and is generally expressed as a complex variable ($S = \sigma + j\omega$, this is well known).

Figure 18:
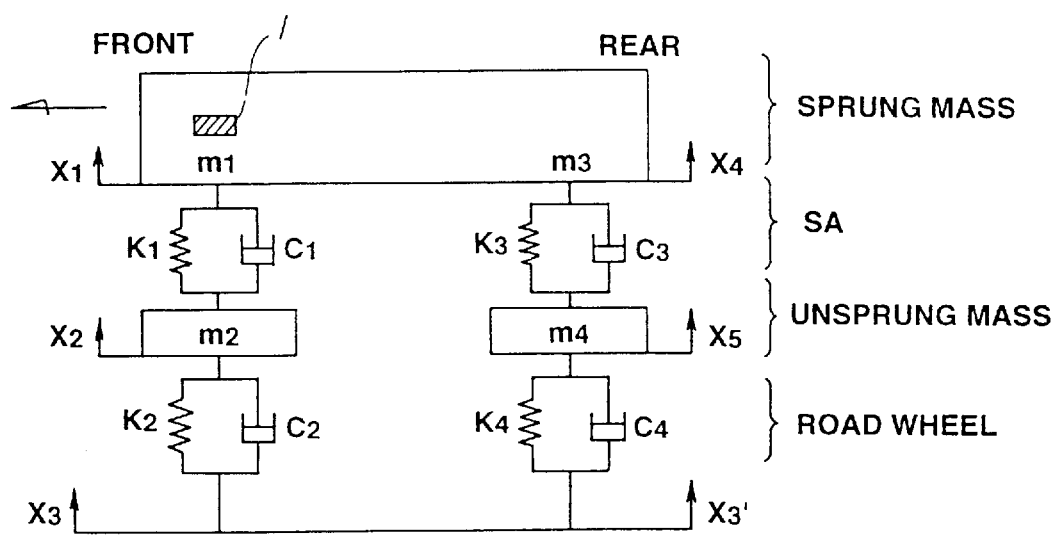
FIG. 18 is an explanatory view for explaining a transfer function calculation model adopted in the first embodiment shown in FIGS. 1 and 2.

FIG. 18 shows an explanatory view of a transfer function calculation model used in the first embodiment.

In FIG. 18, $x_1$ denotes a front road wheel side (position) sprung mass input (input variable), $x_2$ denotes a front road wheel side (position) sprung mass input (variable), $x_3$ denotes a front road wheel side (position) road surface (vibration) input (variable), $x_4$ denotes a rear road wheel side (position) sprung mass input (variable), $m_1$ denotes a front road wheel side (position) sprung mass, $m_2$ denotes a front road wheel side (position) unsprung mass, $c_1$ denotes an attenuation coefficient of a front road wheel side (position) suspension system (constituted by the front left and right road wheel positioned shock absorbers), $c_2$ denotes an attenuation coefficient of each one of the front left and right road wheels, $k_1$ denotes a spring constant of the front road wheel side suspension system, $k_2$ denotes a spring constant of each of the front road wheels, $x_5$ denotes a rear road wheel side (position) unsprung mass (vibration) input (variable), $x_{3'}$ denotes a rear road wheel side (position) road surface (vibration) input (variable), $m_3$ denotes a rear road wheel side (position) unsprung mass, $c_3$ denotes an attenuation coefficient of each of the rear left and right road wheels, $c_4$ denotes an attenuation coefficient of each of the rear road wheel positioned road wheels, $k_3$ denotes a spring constant of the rear road wheel side suspension system constituted by the rear left and right road wheel positioned shock absorbers, and $k_4$ denotes a spring constant of each of the rear left and right road wheels.

Figure 19A:
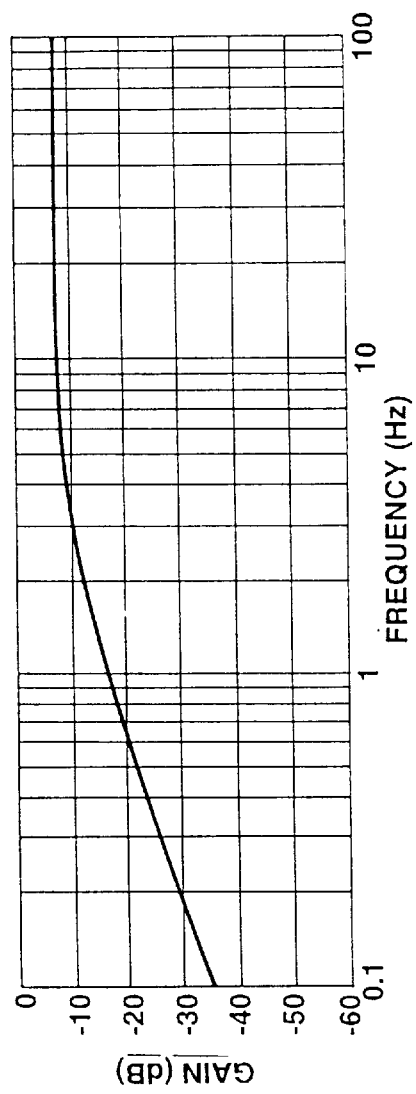
FIGS. 19A and 19B are characteristic graphs of gain and phase characteristics of a transfer function $G_{S(S)}$ from a sprung mass vertical acceleration at the front road wheel positions up to a corresponding relative velocity between the sprung mass and unsprung mass in the semi-logarithmic scale, in the case of the first embodiment.
Figure 19B:
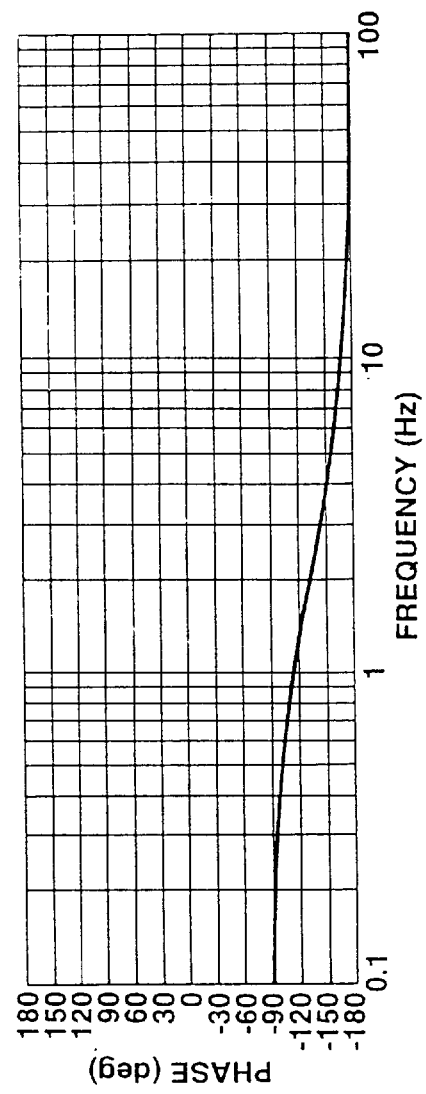

FIGS. 19A and 19B show the gain characteristic and phase characteristic of the above-defined transfer function $G_{5(S)}$.

Referring back to FIG. 13, at a block B4, control signals $V_{FL}$ and $V_{FR}$ used to control the damping force characteristics for the front left and right road wheel positioned shock absorbers $SA_{FL}$ and $SA_{FR}$ are derived using the following equation (2) on the basis of the respective front road wheel positioned sprung mass vertical velocities (signals) $\Delta x$ ($\Delta x_{FL}$, $\Delta x_{FR}$) derived at the block B2 and the respective relative velocities $(\Delta x - \Delta x_0)$ $[(\Delta x - \Delta x_0)_{FL}, (\Delta x - \Delta x_0)_{FR}]$ between the sprung mass and unsprung mass at the front left and right road wheel positions. At the same block B3, the control unit 4 calculates the target damping force characteristic positions P ($P_{FL}$, $P_{FR}$) in proportion to the corresponding control signals $V_{FL}$ and $V_{FR}$, respectively, using the following equation (3).

$$V = (g)\Delta x/(\Delta x - \Delta x_0), \tag{2}$$

and $$P = (V/V_H) \cdot P_{MAX}. \tag{3}$$

If $V \geq V_H$, $P = P_{MAX}$ (refer to FIG. 15A).

$V_H$ denotes a threshold value of the proportional control of the damping force characteristic and $P_{MAX}$ denotes a maximum damping force characteristic position.

Since the control signal V is diverged into infinite when the relative velocity $(\Delta x - \Delta x_0)$ at the denominator of the control signal derived using the equation (2), in order to prevent this divergence, a minute threshold vaLue $X_{min}$ is set and when an absolute value of the relative velocity is equal to or below the minute threshold value $X_{min}$ (namely, $|\Delta x - \Delta x_0| \leq X_{min}$), the corresponding target damping force characteristic P is set to the maximum damping force characteristic position $P_{MAX}$.

On the other hand, at a block B5, a delay processing is carried out for the front left and right road wheel position sprung mass acceleration signals $G_{FL}$ and $G_{FR}$ detected by the vertical sprung mass sensors $1_{FL}$ and $1_{FR}$ in order to be used as rear road wheel positioned processing signals. That is to say, in the first embodiment, a processing of a delay transfer function ($G_{D(S)} = e^{-SR}$, e denotes an exponential and is also expressed as $\epsilon$ ($=\cos(SR) - j \sin(SR)$) from among the transfer functions with the road surface inputs as transfer routes is carried out which sets a delay time R ($R = W_B/(S_V - \phi)$. The delay time R is the result of subtraction of a system response delay time $\phi$ from the delay transfer function which is derived from the vehicle speed $S_V$ and a wheel base length $W_B$ and which corresponds to a time delay from the time at which the front road wheel side road surface input $x_3$ occurs to the time at which the rear road wheel side road surface input $x_{3'}$ occurs. In this way, if the delay time R is set which is the subtraction of the system response delay time $\phi$ from the division of $W_B/S_V$, the control force for the rear road wheel positioned shock absorbers can be generated with the system response delay canceled. The delay processing is carried out before the branched stage of the sprung mass vertical acceleration signals $G_{FR}$ and $G_{FL}$ to the block B1 so that the capacity of memory areas in the memory 4bb used during its programming, namely, the memory capacity of the RAM can be reduced.

At the subsequent step B6, the rear left and right road wheel side (positioned) sprung mass vertical acceleration signals $G_{RL}$ and $G_{RR}$ and the corresponding positioned relative velocity signals $(\Delta x - \Delta x_0)_{RL}$ $(\Delta x - \Delta x_0)$ between the sprung mass and unsprung mass are estimated (calculated) on the basis of the following transfer functions $G_{R(S)}$ and $G_{U(S)}$ from the front left and right road wheel positioned sprung mass vertical acceleration signals $G_{FL}$ and $G_{FR}$ which are passed through the delay processing at the block B5. For the transfer function calculation model, refer to FIG. 18.

$$\begin{aligned} G_{R(S)} &= G_{1(S)} \cdot G_{2(S)} \cdot G_{3(S)} \\ &= x_{3(S)}/x_{1(S)} \cdot x_{3'(S)}/x_{3(S)} \cdot x_{4(S)}/x_{3'(S)} \\ &= x_{4(S)}/x_{1(S)} \\ &= \{(AS^4 + BS^3 + CS^2 + DS + E)(PS^2 + MS + N)\}/ \\ &\quad \{(HS^4 + JS^3 + LS^2 + MS + N)(FS^2 + DS + E)\}. \end{aligned} \tag{4}$$

$$\begin{aligned} G_{U(S)} &= G_{1(S)} \times G_{2(S)} \times G_{4(S)} \\ &= x_{3(S)}/x_{1(S)} \cdot x_{3'(S)}/x_{3(S)} \cdot \\ &\quad \int (x_{4(S)} - x_{5(S)}) ds/x_{3'(S)} \\ &= (x_{4(S)} - x_{5(S)})/x_{1(S)} \\ &= \{(AS^4 + BS^3 + CS^2 + DS + E)(QS^2 + US)\}/ \\ &\quad \{(HS^4 + JS^3 + LS^2 + MS + E)(FS^2 + DS + E)\}. \end{aligned} \tag{5}$$

It is noted that, in the equations (4) and (5), in each of the last equation items $(AS^4 + BS^3 + CS^2 + DS + E)(PS^2 + MS + N)/$ $(HS^4+JS^3+LS^2+MS+N)(FS^2+DS+E)$ and $(AS^4+BS^3+CS^2+DS+E)(QS^2+US)/(HS^4+JS^3+LS^2+MS+E)(FS^2+DS+E)$, a part corresponding to the delay transfer function is omitted.

It is also noted that $G_{1(S)}$ denotes the transfer function from one of the front road wheel positions up to the road surface, $G_{2(S)}$ denotes a delay transfer function in a input timing difference between the vehicle body at one of the front road wheel positions and that at one of the rear road wheel positions, $G_{3(S)}$ denotes the transfer function from the road surface up to one of the rear road wheel positioned sprung mass, and $G_{4(S)}$ denotes the transfer function from the road surface up to one of the rear road wheel positioned relative velocities.

It is further noted that, in the equations (4) and (5), $A=m_1 \cdot m_2$
$B=m_1(c_1+c_2)+m_2 c_1$
$C=m_1(k_1+k_2)+c_1 \cdot c_2+m_2 \cdot k_1$
$D=c_1 k_2+k_1 \cdot c_2$
$E=k_1 k_2$
$F=c_1 c_2$
$H=m_3 m_4$
$J=m_3(c_3+c_4)+m_4 c_3$
$L=m_3(k_3+k_4)+c_3 c_4+m_4 k_3$
$M=c_3 k_4+k_4 c_3$
$N=k_3 k_4$
$P=c_3 c_4$
$Q=-m_3 c_4$ and
$U=-m_3 k_4$.

FIGS. 20A and 20B show the gain and phase characteristics of the above-described transfer function $G_{R(S)}$.

Figure 21A:
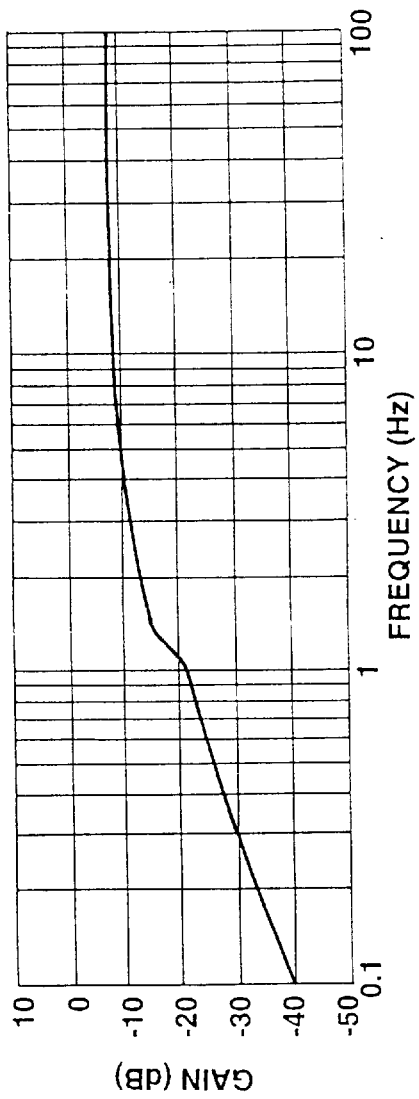
FIGS. 21A and 21B are characteristic graphs of gain and phase characteristics of a transfer function $G_{U(S)}$ from the front (left and right) road wheel position sprung mass vertical accelerations to the rear (left and right) road wheel position relative velocities between the sprung mass and unsprung mass in the semi-logarithmic scale in the first embodiment.
Figure 21B:
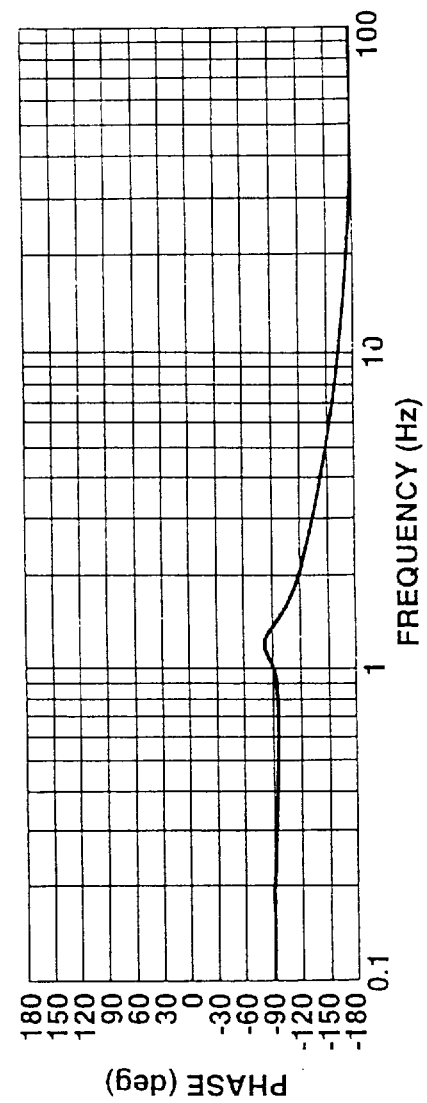

FIGS. 21A and 22B show the gain and phase characteristics of the above-described transfer function $G_{U(S)}$.

Referring back to FIG. 13, in the same way as the block B1, the velocity converting filters (LPFs) are used at a block B7 to convert the estimated rear left and right road wheel positioned sprung mass acceleration signals $G_{RL}$ and $G_{RR}$ into the corresponding rear left and right road wheel positioned sprung mass vertical velocity signals.

At the subsequent block B8, the band pass filtering operation is carried out for the rear road wheel left and right road wheel positioned vertical velocity signals in order to cut off the frequency components other than the target frequency band to be controlled, in the same way as carried out at the block B2. That is to say, at the block B8, these band pass filters BPFs used at the block B8 serves to extract the rear left and right road wheel positioned sprung mass vertical velocity signals $\Delta x$ ($\Delta x_{RL}$, $\Delta x_{RR}$) in the vehicle body sprung mass resonance frequency band which is the target of control.

At a block B9, in the same way as carried out at the block B4 described above, control signals $V_{RL}$ and $V_{RR}$ for the rear left and right road wheel positioned shock absorbers $SA_{RL}$ and $SA_{RR}$ are formed on the basis of the rear left and right road wheel positioned sprung mass vertical velocity signals $\Delta x$ ($\Delta x_{RL}$, $\Delta x_{RR}$) derived at the block B8 and on the basis of the rear left and right road wheel positioned relative velocity signals between the sprung mass and unsprung mass ($\Delta x - \Delta x_0$) [$(\Delta x-\Delta x_0)_{RL}$, $(\Delta x-\Delta x_0)_{RR}$] using the above-described equation (2) and the target damping force characteristic positions P ($P_{RL}$, $P_{RR}$) for the respective stepping motors 3 for the rear left and right road wheel positioned shock absorbers $SA_{RL}$ and $SA_{RR}$ are calculated using the equation (3) which are proportional to the control signals $V_{RL}$ and $V_{RR}$.

As described above, the suspension system damping force controlling apparatus in the first embodiment has the following advantages:

(1) In the suspension damping force characteristic controlling apparatus requiring the front left and right road wheel positioned sprung mass vertical velocity signals $\Delta x_{FL}$, $\Delta x_{FR}$, correspondingly positioned relative velocity signals $(\Delta x-\Delta x_0)_{FL}$, $(\Delta x-\Delta x_0)_{FR}$, the rear left and right road wheel positioned sprung mass vertical velocity signals $\Delta x_{RL}$, $\Delta x_{RR}$, and the correspondingly positioned relative velocity signals $(\Delta x-\Delta x_0)_{RL}$ and $(\Delta x-\Delta x_0)_{RR}$, only front left and right road wheel positioned vertical G sensors $1_{FL}$ and $1_{FR}$ are installed on the vehicle body corresponding positions as the sensors in the apparatus. Hence, the other required sensors can be omitted. The system configuration can be simplified so that an easiness in mounting the apparatus in the vehicle can be improved. A system cost of manufacturing the suspension system damping force controlling apparatus can be reduced.

(2) As compared with the previously proposed suspension system damping force characteristic controlling apparatus described in the BACKGROUND OF THE INVENTION in which the vibration input of the front road wheel side is used as the correction signal to merely preview the damping force characteristic control for the rear road wheel positioned shock absorbers, the sprung mass vertical velocities of the sprung mass at the rear road wheel positions can accurately be estimated according to the transfer function from the front road wheel side sprung mass vertical velocities up to the rear road wheel side sprung mass vertical velocities with the road surface input as the transfer route. Thus, the optimum control force can be generated.

FIGS. 22A, 22B, 22C, 22D, 22E, and 22F show integrally a timing chart indicating results of simulations on actual vehicle running tests.

FIG. 22A shows the actually measured sprung mass vertical velocity signal at one of the front left and right road wheel positions.

FIG. 22B shows the actually measured relative velocity signal between the sprung mass and unsprung mass at one of the front left and right road wheel positions.

FIG. 22C shows the actually measured rear road wheel position sprung mass vertical velocity signal at one of the rear left and right road wheels.

FIG. 22D shows the actually measured relative velocity signal between the sprung mass and the unsprung mass at one of the rear left and right road wheel positions.

FIG. 22E shows the rear road wheel side (position) sprung mass vertical velocity signal derived using the transfer function described in the first embodiment.

FIG. 22F shows the rear road wheel side (position) relative velocity signal between the sprung mass and the unsprung mass at one of the rear left and right positions according to the transfer function in the first embodiment.

As appreciated from FIG. 22E, the rear road wheel side sprung mass vertical velocity signal derived using the transfer function in the first embodiment can achieve such a waveform as not to be enabled to be obtained by merely delaying the front road wheel side sprung mass vertical velocity signal (particularly, refer to a part of the waveform shown in FIG. 22E which is denoted by arrow marks of ·X·). As compared with FIG. 22A, the rear road wheel side (position) sprung mass vertical velocity signal derived using the transfer function shown in FIG. 22E which has the characteristics of the gain and phase which are generally approximate to those of the actually measured front road wheel side sprung mass vertical velocity signal shown in FIG. 22A can be achieved.

(3) Since such a processing of the sprung mass vertical acceleration signals ($G_{FL}$ and $G_{FR}$) using the delay transfer function which sets the delay time R which is the subtraction of the system response delay time φ from the delay transfer function corresponding to the time delay derived from the vehicular wheel base length $W_B$ and the vehicle speed $S_V$ from the time at which the front road wheel side road surface input $x_3$ to the time at which the rear road wheel side road surface input $x_3$, occurs is carried out from among the transfer functions with the road surface input as the transfer route, as shown in FIG. 13, the control force can be generated at the rear road wheel side (position) with the system response delay time canceled. Consequently, the (more) optimum control force can be generated.

Next, second and third preferred embodiments of the suspension system damping force controlling apparatus according to the present invention will be described below. Since, in the second and third embodiments, the content of the signal processing circuit is different from that of the first embodiment in the control unit 4, the other structures are generally the same as those in the case of the first embodiment. Therefore, only the different point from the first embodiment will be explained.

(Second Embodiment)

Figure 23:
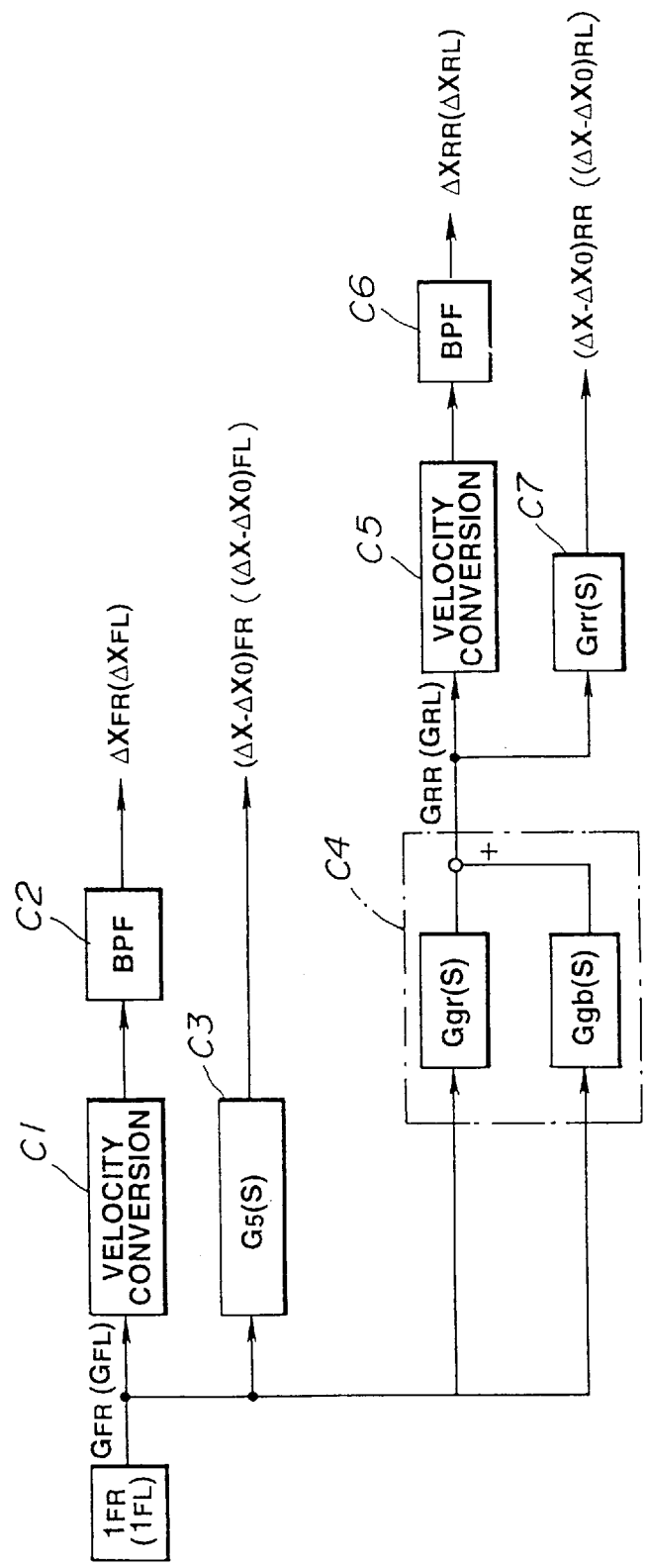
FIG. 23 is a circuit block diagram of another signal processing circuit in the case of a second preferred embodiment of the suspension system damping force characteristic controlling apparatus according to the present invention.

In the suspension system damping force controlling apparatus in a second preferred embodiment, the following signal processing circuit shown in FIG. 23 is incorporated.

First, at a block C1, the velocity converting filters are used to convert the front left and right road wheel position sprung mass vertical acceleration signals $G_{FL}$ and $G_{FR}$ at the front left and right road wheel positions detected by the two front road wheel positioned sprung mass vertical acceleration (G) sensors $1_{FL}$ and $1_{FR}$ into the corresponding sprung mass vertical velocity signals, respectively, in the same manner as carried out at the block B1 shown in FIG. 13.

At the subsequent block C2, the band pass filters (BPFs) (representatively expressed as BPF in FIG. 23) are used to cut off the frequency components other than the target frequency band to perform the control of the damping force characteristics of the rear left and right road wheel positioned shock absorbers $SA_{RL}$ and $SA_{RR}$, in the same manner as carried out at the block B2 shown in FIG. 13, so that the sprung mass vertical velocity signals $\Delta x_{FL}$ and $\Delta x_{FR}$ at the rear left and right road wheel positions are derived.

On the other hand, at a block C3, in the same manner as carried out at the block B3 of FIG. 13, the relative velocity signals between the sprung mass and the unsprung mass at the front left and right road wheel positions $(\Delta x-\Delta x_0)_{FL}$ and $(\Delta x-\Delta x_0)_{FR}$ are calculated (estimated) using the transfer function $G_{5(S)}$ from the respectively corresponding sprung mass vertical accelerations at the front left and right road wheel positions up to the relative velocities between the sprung mass and the unsprung mass at the respectively corresponding front left and right road wheel positions (these are transfer routes) from the signals described below: that is to say, from the front left and right road wheel positioned vertical acceleration signals $G_{FL}$ and $G_{FR}$ detected by the two front road wheel positioned vertical acceleration (G) sensors $1_{FL}$ and $1_{FR}$.

At a block C4, the sprung mass vertical acceleration signals $G_{RL}$ and $G_{RR}$ at the rear left and right road wheel position sprung mass are calculated on the basis of a vertical transfer function $G_{gr(S)}$ with the road surface input as its transfer route shown in the following equation (6) and on the basis of a sprung mass forward/rearward transfer function $G_{gb(S)}$ with the vehicle body sprung mass as its transfer route shown in the following equation (7) from the front left and right road wheel position sprung mass vertical acceleration signals $G_{FL}$ and $G_{FR}$.

It is noted that the vertical transfer function $G_{gr(S)}$ with the road surface input as its transfer route includes the delay transfer function $(G_{D(S)}=e^{-SR})$ which sets the delay time R $(R=W_B/S_V-\phi)$ as described in the first embodiment with reference to FIG. 13.

$$G_{gr(S)} = x_{4r(S)}/x_{1(S)} \quad (6)$$
$$= x_{3(S)}/x_{1(S)} \cdot x_{3'(S)}/x_{3(S)} \cdot x_{4r(S)}/x_{3'(S)}$$
$$= G_{gr1(S)} \cdot G_{D(S)} \cdot G_{gr2(S)}.$$

$$G_{gb(S)} = x_{4b(S)}/x_{1(S)}. \quad (7)$$

It is noted that, in the equations (6) and (7), $G_{gr1(S)}$ denotes a transfer function from one of the front left and right road wheel position sprung mass vertical accelerations up to the road surface input of one of the front left and right road wheels;

$G_{gr2(S)}$ denotes a transfer function from the road surface input of one of the rear left and right road wheels up to the corresponding one of the rear road wheel position sprung mass vertical accelerations;

$x_{4r}$ denotes a state variable in the vertical direction at the rear road wheel side transmitted from the corresponding rear road wheel road surface input; and $x_{4b}$ denotes a state variable in the vertical direction at the rear road wheel side transmitted from the front road wheel side via a transfer route defined in the vehicular forward/rearward (longitudinal) direction (,i.e., front left road wheel side→rear left road wheel side, front right road wheel side→rear right road wheel side).

It is also noted that the rear road wheel side (position) sprung mass state variable $x_4$ is derived according to the following equation (8).

$$x_4=x_{4r}+x_{4b}. \quad (8)$$

Referring back to FIG. 23, at a block C5, in the same manner as carried out at the block C1 described above, the velocity converting filters are used to convert the calculated sprung mass vertical acceleration signals $G_{RL}$ and $G_{RR}$ at the rear left and right road wheel positions into the sprung mass vertical velocity signals at the rear left and right road wheel positions, respectively. At a block C6, in the same manner as carried out at the block C2, the band pass filters (BPF) is used to extract the sprung mass vertical velocity signal $\Delta x_{RL}$ and $\Delta x_{RR}$ at the rear left and right road wheel positions with the sprung mass resonance frequency band as the target, respectively.

At a block C7, the relative velocity signals between the sprung mass and the unsprung mass at the rear left and right road wheel positions denoted by $(\Delta x-\Delta x_0)_{RL}$ and $(\Delta x-\Delta x_0)_{RR}$ are calculated from the calculated sprung mass vertical acceleration signals $G_{RL}$ and $G_{RR}$ at the rear left and right road wheel positions at the block C4 using a transfer function $G_{rr(S)}$ ($G_{rr(S)}$ is approximately equal to $G_{U(S)}$) from each of the rear road wheel sprung mass vertical accelerations up to the relative velocity at the corresponding one of the rear left and right road wheel positions.

That is to say, in the second embodiment, at the block C4, the sprung mass vertical acceleration signals $G_{RL}$ and $G_{RR}$ at the rear left and right road wheel positions are respectively derived from the sprung mass vertical acceleration signals $G_{FL}$ and $G_{FR}$ at the front left and right road wheel positions using the transfer function $G_{gb(S)}$ in the direction of the sprung mass forward/rearward direction with the vehicle body sprung mass as the transfer route thereof in addition to the transfer function $G_{gr(S)}$ in the vertical direction with the road surface input as the transfer route thereof. The above-described matter is the difference point from the first embodiment.

Since the transfer function $G_{gb(S)}$ in the sprung mass forward/rearward direction with the vehicle body sprung mass as the transfer route is added, the rear road wheel side vehicular behaviors can further accurately be estimated, the more optimum control force at the rear road wheel side can be generated.

It is noted that the delay transfer function ($G_{D(S)}=e^{-SR}$) which sets the delay time R ($R=W_B/S_V-\phi$) which is the subtraction of the system response delay time $\phi$ from the delay function corresponding to the time delay from the time at which the front road wheel side road surface input occurs to the time at which the rear road wheel side road surface input occurs, the delay function being derived from the vehicular wheel base length $W_B$ and the vehicle speed $S_V$, is included in the transfer function $G_{gr(S)}$ in the vertical direction as the road surface input as its transfer route.

(Third Embodiment)

Figure 24:
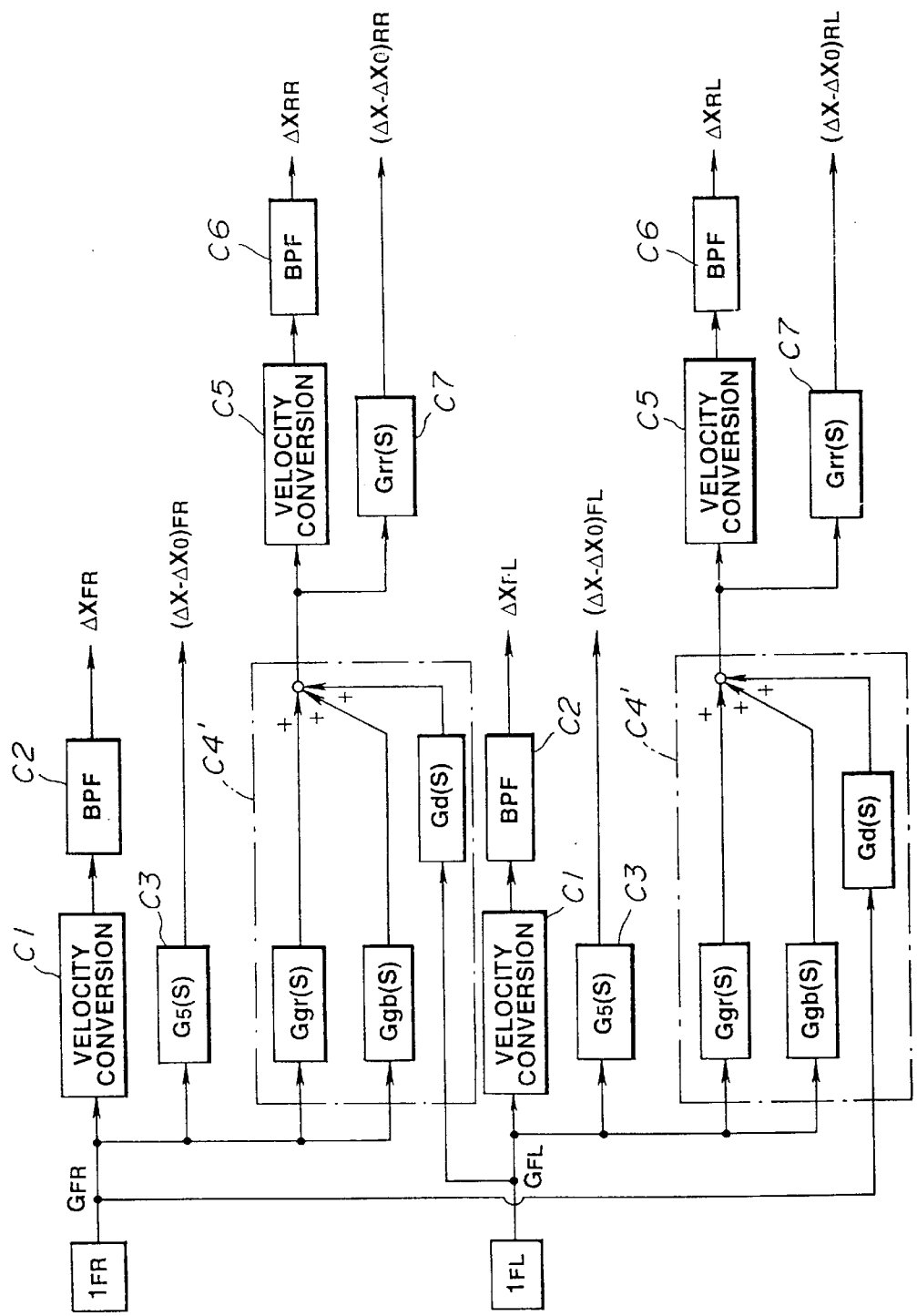
FIG. 24 is a circuit block diagram of a still another signal processing circuit in the case of a third preferred embodiment of the suspension system damping force characteristic controlling apparatus according to the present invention.

In the suspension system damping force controlling apparatus in a third preferred embodiment, the following signal processing circuit in the control unit 4 shown in FIG. 24 is incorporated.

The structure of the signal processing circuit shown in FIG. 24 is generally the same as that in the case of the second embodiment shown in FIG. 23.

However, the difference point in FIG. 24 from that shown in FIG. 23 will be described below.

In each block C4' of FIG. 24, the sprung mass vertical acceleration signals $G_{RL}$ and $G_{RR}$ at the rear left and right road wheel positions are calculated using a sprung mass diagonal direction transfer function $G_{d(S)}$ with the sprung mass as its transfer route as shown in the following equation (9) in addition to the vertical direction transfer function $G_{gr(S)}$ with the road surface input as its transfer route and the sprung mass forward/rearward direction transfer function $G_{gb(S)}$ with the sprung mass as the transfer route thereof (used in the case of the second embodiment).

Figure 25:
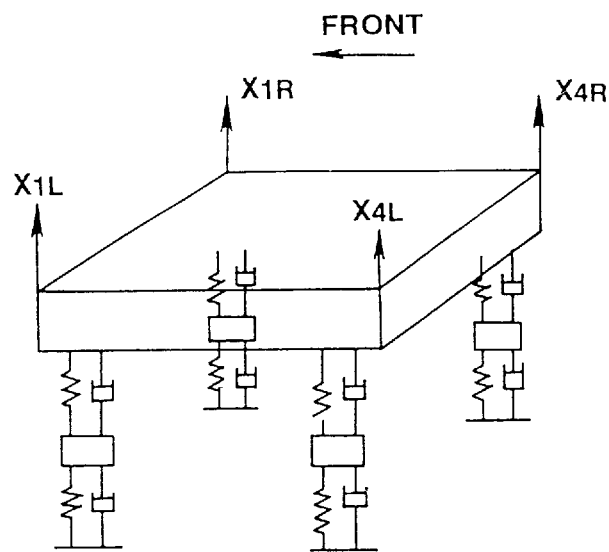
FIG. 25 is an explanatory view (perspective view) for explaining another transfer function calculation model in the third preferred embodiment of the suspension damping force controlling apparatus.

FIG. 25 shows the transfer function calculation model in the case of the third embodiment.

Since, in the third embodiment, the sprung mass diagonal direction transfer function $G_{d(S)}$ in which the sprung mass is its transfer route is added, the more accurate estimation of the rear road wheel side vehicle behaviors can be made. Consequently, the more optimum control force at the rear road wheel side shock absorbers $SA_{RL}$ and $SA_{RR}$ can be generated.

$$G_{d(S)}=x_{4L(S)}/x_{1R(S)}=x_{4R(S)}/x_{1L(S)}. \tag{9}$$

In the equation (9), $x_{1L}$ denotes the state variable of the front left road wheel position sprung mass;

$x_{1R}$ denotes the state variable of the front right road wheel side sprung mass;

$x_{4L}$ denotes the state variable of the rear left road wheel position sprung mass caused by the front right road wheel input;

$x_{4R}$ denotes the state variable of the rear right road wheel position sprung mass caused by the front left road wheel input;

$x_{4d}$ denotes the state variable of the vertical direction at the rear road wheel positions transmitted from the front road wheel positions via the transfer route in the diagonal direction with respect to the vehicle body (front right road wheel side→rear left road wheel side and front left road wheel side→rear right road wheel side) and is derived using the above-described transfer function $G_{d(S)}$.

In addition, the state variable of the rear road wheel side sprung mass $x_4$ is derived from the following equation (10).

$$x_4=x_{4r}+x_{4b}+x_{4d}. \tag{10}$$

(Alternatives of the first, second, and third embodiments)

Although, in the first, second, and third embodiments, the sprung mass vertical G sensors are installed on the sprung mass at the front left and right road wheel positions, the number of installations of the sprung mass vertical G sensors are arbitrary. The present invention is applicable to the suspension system having a single vertical G (sprung mass vertical acceleration) sensor installed at the front road wheel position, for example, a generally center of the front left and right road wheel positions.

Although, in the first, second, and third embodiments, such shock absorbers as having the damping force characteristic varying means (adjuster) whose damping force characteristics are controlled such that when the damping force characteristic at either one of the extension and compression phases is variably controlled, the damping force characteristic at the other phase of either of the extension and compression phase is controlled to provide the low damping force characteristic, the present invention is applicable to a vehicular suspension system having such shock absorbers that the damping force characteristics at both of the extension and compression phases are variably controlled.

Although, in the first, second, and third embodiments, such transfer functions as described in the equations (1), (4), (5), and so forth are used to derive the front road wheel side relative velocity signals, the rear road wheel side sprung mass vertical velocity signals, the rear road wheel side relative velocity signals between the sprung mass and the unsprung mass, and the rear road wheel side sprung mass vertical acceleration signals from the front road wheel side vertical acceleration signals, these transfer functions indicate higher order functions. In this case, the transfer function equations become complex and the capacity of programming becomes large. Alternatively, approximation functions or approximation filters such as lower order transfer functions, normally used band pass filters (BPFs) or high pass filters (HPFs) may be used whose gain and phase characteristics are not varied in the frequency band requiring the control of the damping force characteristics of the respective shock absorbers.

In addition, although, in each of the first, second, and third embodiment, the equation (2) is used to derive the control signal V, the control signal may be derived using a correction value KU derived from an inverse of the relative velocity $(\Delta x-\Delta x_0)$ as described in the equation (11) in order to prevent the control signal from being diverged to the infinite.

$$V=V'=\Delta x\cdot KU. \tag{11}$$

Figure 26:
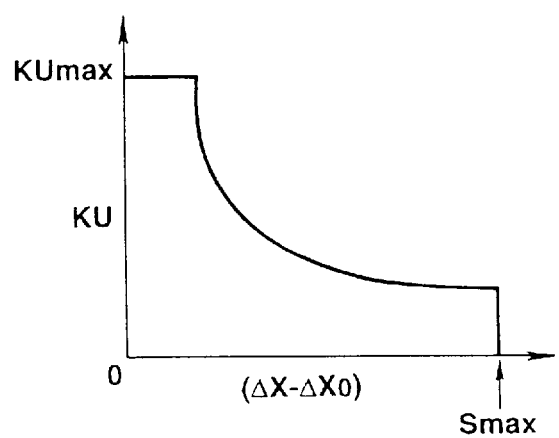
FIG. 26 is an inversely proportional map indicating an alternative of an inversely proportional function use in the case of the first embodiment.

Furthermore, in place of the equation (11), a inverse proportional map shown in FIG. 26 may be used.

In FIG. 26, $KU_{max}$ denotes a maximum value of KU fixed when the corresponding relative velocity $(\Delta x-\Delta x_0)$ is equal to or below a predetermined lower limit threshold value $S_{min}$. As shown in FIG. 26, when the corresponding relative velocity $(\Delta x-\Delta x_0)$ becomes equal to or below a predetermined upper limit value $S_{max}$, the correction value KU is fixed at a certain value.

Finally, although, in each of the first, second, and third embodiments, the above-described equation (3) is used to derive the target damping force characteristic position P from the corresponding control signal V, a dead zone $V_{NC}$ may be provided for the control signal V in order to prevent the target damping force characteristic position P from being in a hunting phenomenon due to minute upward and downward directional movements of the control signal in the vicinity to zero. In this case, the target damping force characteristic position P is derived as follows:

$$P=\{(V-V_{NC})/(V_H-V_{NC})\}\cdot P_{max}. \quad (12)$$

It is noted that the gain g of the equation (2) used to derive the control signal V may be varied according to the vehicle speed detected by the vehicle speed sensor 2.

(Fourth Embodiment)

In the suspension system controlling apparatus of a fourth preferred embodiment according to the present invention, the signal processing circuit in the control unit 4 described in the first embodiment shown in FIG. 13 is incorporated although the other structures are generally the same as those in the first embodiment.

In addition, the damping force characteristic control flowchart shown in FIG. 14 is incorporated in the fourth embodiment.

However, in the steps of 101 and 103, each vertical velocity signal Δx is compared with zero.

At the step 102, the extension phase is varied in the hard damping force characteristic with the compression phase fixed to the soft damping force characteristic, i.e., in the HS control mode. At this time, the damping force characteristic at the extension phase (the target damping force characteristic position $P_T$) is varied in proportion to the corresponding sprung mass vertical velocity Δx as follows:

$$P_T=\alpha\cdot\Delta x\cdot K \quad (13)$$

In the equation (13), α denotes a constant at the extension phase, K denotes a gain variably set according to the corresponding sprung mass relative velocity $(\Delta x - \Delta x_0)$.

At the step 104 in the fourth embodiment, the compression phase damping force characteristic is controlled at the hard region with the extension phase characteristic fixed to the soft damping force characteristic. The target damping force characteristic position $P_C$, i.e., compression phase damping force characteristic is varied in proportion to the corresponding sprung mass vertical velocity delta x as follows:

$$P_C=\beta\cdot\Delta x\cdot K. \quad (14)$$

In the equation (14), β denotes a compression phase constant.

Next, FIGS. 27A through 27E show integrally a timing chart indicating a switching operation of control regions mainly in the representative shock absorber SA from among the damping force characteristic control operations.

Figure 27A:
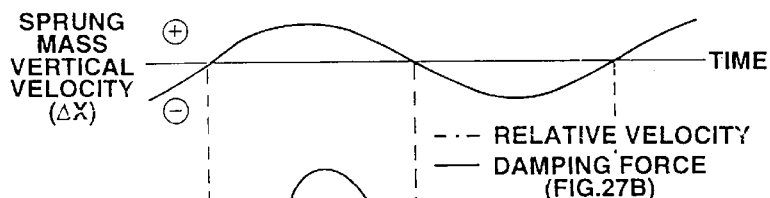

In FIGS. 27A through 27E, the sprung mass vertical velocity Δx is taken as shown in FIG. 27A and the target damping force characteristic position $P_T$ at the extension phase of each shock absorber SA (the drive signal for each corresponding one of the stepping motors 3) $P_T$ is at the plus side (positive) as shown in FIG. 27E and the target damping force characteristic position at the compression phase of each shock absorber $P_C$ (the drive signal for each corresponding one of the stepping motors 3) is at the minus side (negative).

Figure 27B:
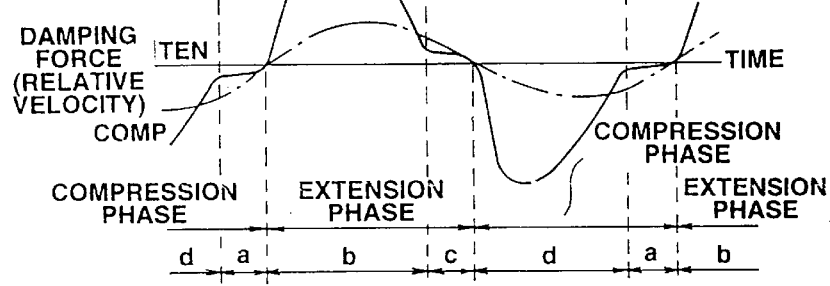
Figure 27C:
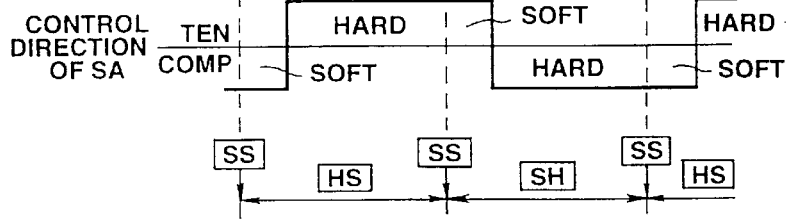
Figure 27D:
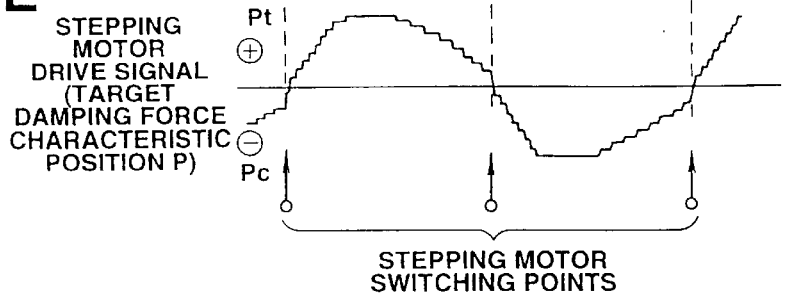

The other explanations of FIGS. 27B, 27C, and 27D are generally the same as those explained in the first embodiment with reference to FIGS. 15B, 15C, and 15D, respectively. Therefore the detailed explanations for FIGS. 27B, 27C, and 27D are omitted here.

Next, a basic control on the damping force characteristics for the rear left and right road wheel shock absorbers $SA_{RL}$ and $SA_{RR}$ and the content of a switching control operation to a corrective control from the control operations in the control unit 4 will be described with reference to FIGS. 28 and 29.

Figure 28:
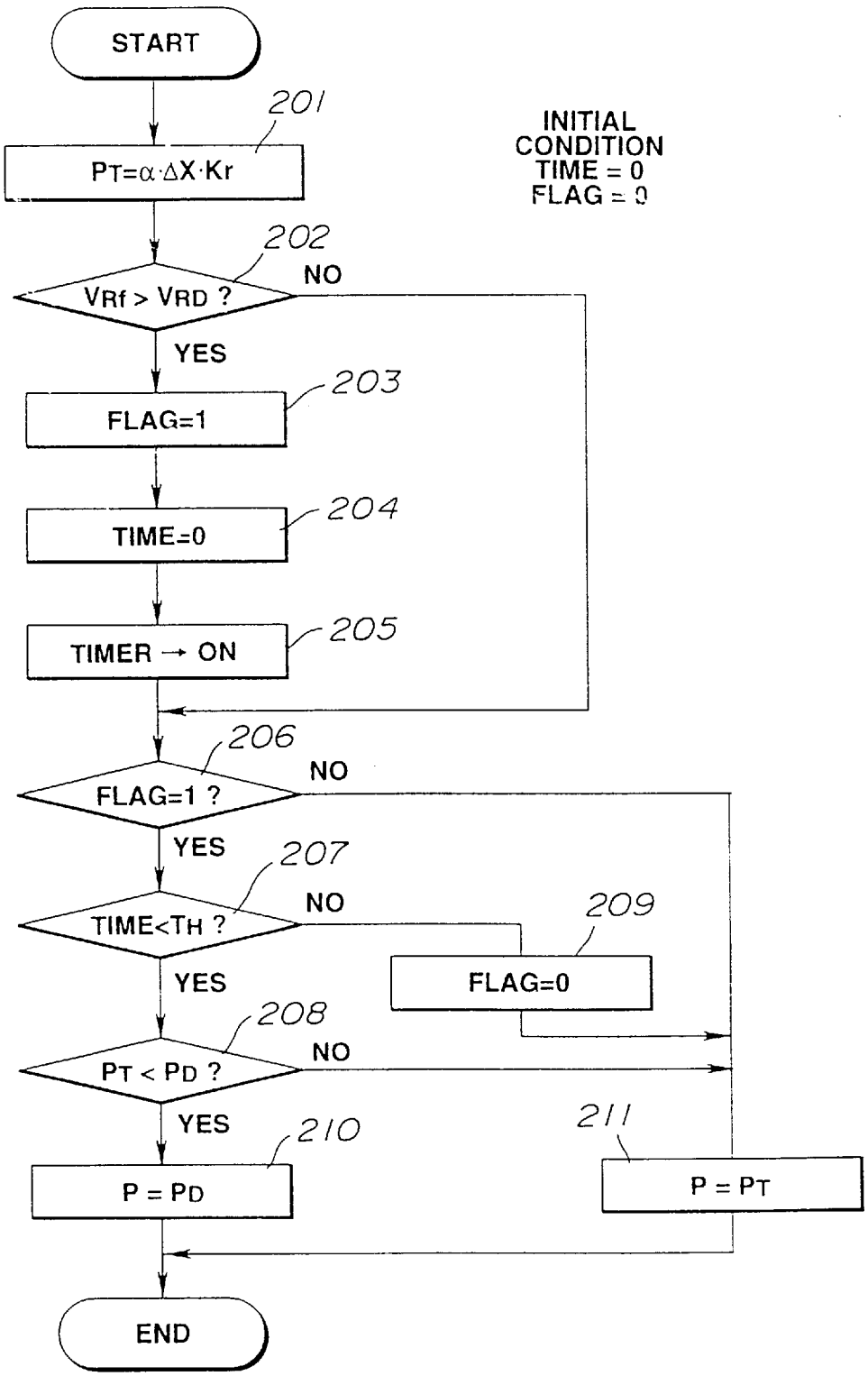
FIG. 28 is an operational flowchart for explaining a switching operation between a basic damping force characteristic control by means of a basic control portion and a correction damping force characteristic control by means of a correction control portion executed in the control unit in the case of the fourth embodiment.

As shown in FIG. 28, at a step S201, the damping force characteristic position $P_T$ at the extension phase in the basic control is derived on the basis of the following equation (15).

$$P_T=\alpha\cdot\Delta x\cdot Kr. \quad (15)$$

In the equation (15), Kr denotes a gain determined according to each of the rear left and right road wheel position relative velocities between the sprung mass and unsprung mass $((\Delta x-\Delta x_0)_{RL}, (\Delta x-\Delta x_0)_{RR})$.

A the next step 202, the CPU 4b in the control unit 4 determines whether each of the front road wheel side relative velocities $V_{Rf}$ [$(\Delta x-\Delta x_0)_{FL}$, $(\Delta x-\Delta x_0)_{FR}$ exceeds a predetermined threshold value $V_{RD}$.

If each of the front road wheel side relative velocities $V_{Rf}$ exceeds the predetermined threshold value $V_{RD}$, the routine goes to a step 203 in which a correction control flag (Flag) is set to 1. Thereafter, the routine goes to a step 204 in which a counting time of a timer (Time) is reset to zero and, then, at a step 205, the timer is set to ON.

Thereafter, the routine goes to a step 206. If NO, namely, each of the front road wheel side relative velocity $V_{Rf}$ is not exceeded the predetermined threshold value $V_{RD}$, the routine jumps to the step 206.

At the step 206, the CPU 4b determines whether the correction control flag (Flag) is set to 1. If YES at the step 206, the routine goes to a step 207. If NO at the step 206, the routine goes to a step 211 in which the extension phase target damping force characteristic position P is set to the damping force characteristic position $P_T$ at the extension phase at the basic control so that the associated stepping motor 3 is normally controlled.

On the other hand, at the step 207, the CPU 4b determines whether the time of the timer (Time) is below a preset correction control ON time duration TH. If YES at the step 207, namely, Timer<TH, the routine goes to a step 209 in which the correction control flag Flag is reset to zero and the routine goes to the step 211 to return to the normal basic damping force characteristic control (refer to a time $TH_4$ of FIG. 29).

At the step 208, the CPU 4b determines whether the damping force characteristic position $P_T$ at the extension phase during the basic damping force characteristic control operation is below an extension phase limit position $P_D$ set at a predetermined hard characteristic.

Figure 29:
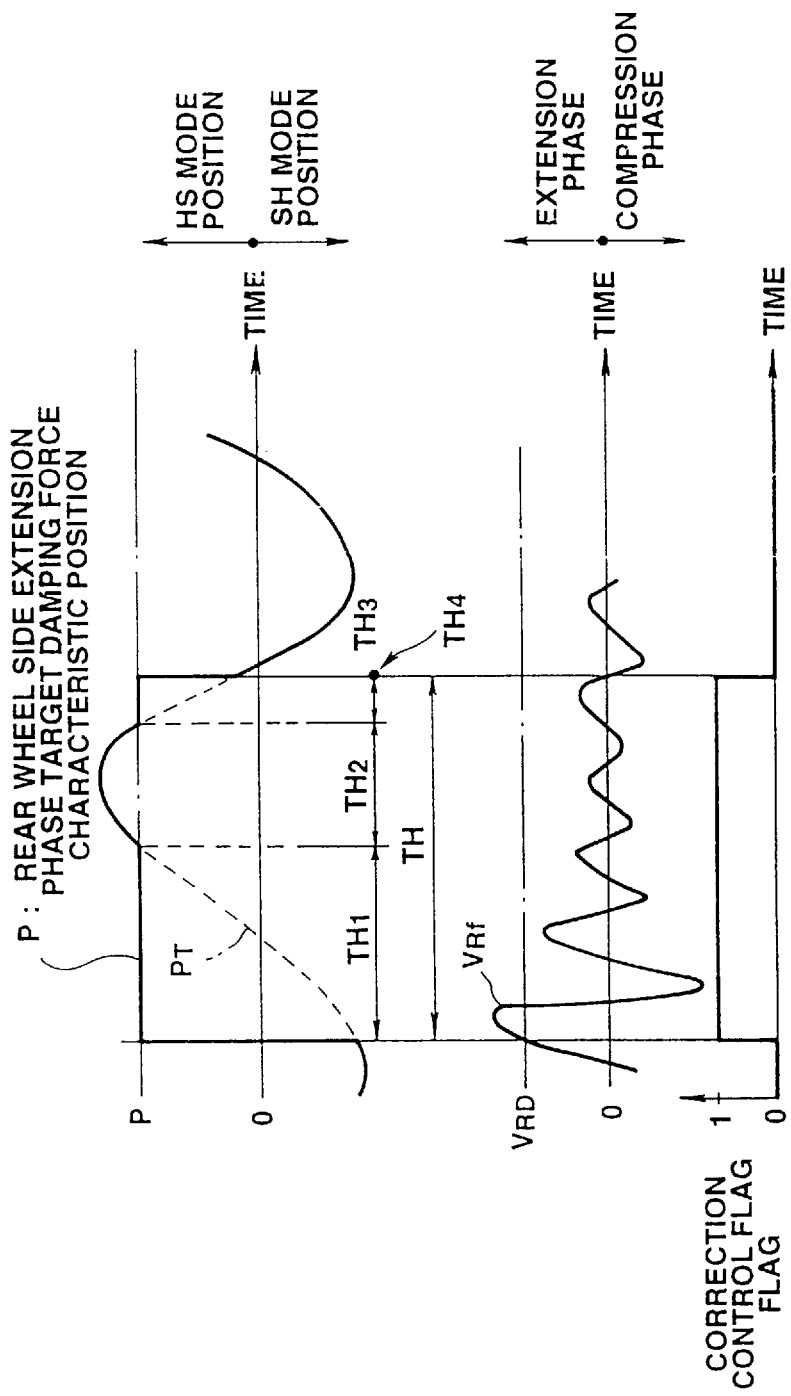
FIG. 29 is a signal timing chart for explaining the switching operation executed in the control unit in the fourth embodiment shown in FIG. 28.

If YES at the step 208, the routine goes to a step 210 in which the extension phase target damping force characteristic position P for the respective rear road wheel side positioned shock absorbers $SA_{RL}$ and $SA_{RR}$ are set to the respective extension phase limit positions $P_D$ so that the corresponding stepping motors 3 can speedily be driven so as to hole the corresponding positions $P_D$ (refer to $TH_1$ and $TH_3$ of FIG. 29). This is one routine. On the other hand, if $P_T \geq P_0$ (NO at the step 208, the routine goes to the step 211 in which the target damping force characteristic position P held at the position $P_D$ is switched to the damping force characteristic position $P_T$ and the associated stepping motor 3 is driven to approach to the target position $P_T$.

The above-described routine shown in FIG. 28 is repeated for each predetermined time.

The content of switching control between the basic control and correction control will be described with respect to the timing chart shown in FIG. 29.

(A) When the vehicle on which the suspension system damping force controlling apparatus in the fourth embodiment has run on a normal road surface:

When the vehicle is running on a relatively good paved road having an abrupt convex and recess, the front road wheel side relative velocity between the sprung mass and the unsprung mass $V_{Rf}$ $[(\Delta x-\Delta x_0)_{FL}$ $(\Delta x-\Delta x_0)_{FR}]$ does not exceed the predetermined threshold value $V_{RD}$. At this time, the extension phase damping force characteristic positions P at the rear left and right road wheel positioned shock absorbers $SA_{RL}$ and $SA_{RR}$ are set to the target damping force characteristic positions $P_T$ at the basic control time which are proportional to the corresponding sprung mass vertical velocities $\Delta x_{RL}$ and $\Delta x_{RR}$ in the same way as the compression phase. In this way, the optimum damping force characteristic control based on the Sky Hook control theory is carried out.

(B) When the vehicle passes a road surface having a convex and recess (projection);

When the vehicle is running and immediately after one or each of the front left and right road wheels has passed on a projection (convex and recess, unpaved road) on the road surface, the vehicle body side of the sprung mass is inverted so as to be decreased moderately but the unsprung mass of one of the vehicular road wheels is turned to be abruptly decreased. Therefore, the front road wheel side relative velocity $V_{Rf}$ $[(\Delta x-\Delta x_0)_{FL}$ and $(\Delta x-\Delta x_{FR}]$ exceeds the above-described predetermined threshold value $V_{RD}$.

At this time, for a time during which the correction control ON time duration TH has passed, the extension phase target damping force characteristic positions P are set to the extension phase limit positions $P_D$ which are the predetermined hard characteristic in the correction control mode.

That is to say, the switching control to the extension phase hard control region HS is started. Thereafter, at a time point where the rear road wheels are about to pass the projection by a predetermined delay, the switching to the extension phase hard region HS is already completed or is about to a state where the switching thereto is about to be completed. On the other hand, in the basic control, even if the rear road wheel positioned shock absorbers are controlled from the front road wheel sprung mass vertical velocities with the delay in the phase by the predetermined time, the damping force characteristics at the rear left and right shock absorbers are controlled in proportion to the sprung mass vertical velocities at a time point wherein the rear road wheels pass the projection on the same road surface so that the damping force characteristics at the extension phases are still in the soft characteristics.

However, in the correction control in the fourth embodiment, for the compression phases due to the abrupt pushing ups of the unsprung mass to the sprung mass when the rear road wheels pass the projection on the road surface, the compression phase soft characteristics at the rear left and right shock absorbers $SA_{RL}$ and $SA_{RR}$ cause the transmission of the road surface input onto the vehicle body to be suppressed without the time delay from a point of time at an initial stage of which the rear road wheels pass the projection on the road surface.

Then, for the extension phases due to the abrupt drop of the unsprung mass immediately after the vehicle rear road wheels have passes the projection on the road surface, the extension hard characteristics of the rear left and right road wheel shock absorbers $SA_{RL}$ and $SA_{RR}$ cause the abrupt drop of the unsprung mass to be suppressed without the time delay at the time point wherein the rear road wheels have passed the projection. Consequently, the unsprung mass huntings can be prevented due to the passage of the projection on the road surface.

It is noted that the rear road wheel side damping force characteristic control based on the relative velocity signals between the sprung mass and unsprung mass detected and determined at the rear road wheel side cannot achieve the initially desired control effect due to a delay in a control responsive characteristic for the abrupt vehicular behavior when the rear road wheels pass such a projection on the road surface as described above.

In addition, suppose that the damping force characteristic positions are expressed in their numerical values so that the numerical values becomes larger as the damping force characteristics at the extension phases give harder characteristics. When the target damping force characteristic position $P_T$ at the time of the basic control is below the extension phase limit position $P_D$, the correction control such that the extension hard characteristic is set to the extension phase limit position $P_D$ (the step 210 of FIG. 28). However, when the target damping force characteristic position $P_T$ exceeds the extension phase the extension phase limit position $P_D$, the target position P is set as the target damping force characteristic position $P_T$ (refer to the step 211 of FIG. 28).

It is noted that the above-described correction control ON time duration TH is variable set on the basis of the following equation (16).

$$TH=W_B/(Sv/3.6)+\Delta t \tag{16}$$

In the equation (16), $W_B$ denotes the wheel base length (meter), Sv denotes the vehicle speed (Km/h), $\Delta t$ (sec.) denotes a constant time from a time at which the vibration input when the front road wheel side relative velocities $V_{Rf}$ at the front road wheel position exceed the predetermined threshold value $V_{RD}$ is inputted to those at the rear road wheel position to a time at which the rear road wheel side unsprung mass huntings are settled ($\Delta t>0$).

The suspension system damping force characteristic controlling apparatus in the fourth embodiment can achieve the following advantages:

(1) During the run on the normal (paved) road surface, the optimum damping force characteristic control can be achieved on the basis of the Sky Hook control theory (theorem) by the basic control operation. In addition, the transmission of the unsprung mass vibration input to the sprung mass during the time at which the rear road wheels have passed the projection on the road surface can be suppressed without delay in time according to the compression phase soft characteristics by the correction control operation. Furthermore, at a time immediately after the rear road wheels have passed the projection of the road surface, the unsprung mass huntings can be prevented without delay in time according to the extension phase hard characteristics.

Since the rear road wheel side shock absorber damping force characteristics can be controlled on the basis of the relative velocities at the front road wheel side, the vehicular driver's feeling of the unsprung mass huntings can be prevented without a response delay.

(2) The switching from the soft damping force characteristic to the hard damping force characteristic can be carried out without delay in time. Consequently, a high control response characteristic can be achieved. The switching from the hard characteristic to the soft characteristic can, in turn, be carried out without drive to the actuator (each of the stepping motors 3). Thus, a durability of the actuator and power economy can be achieved.

The other advantages in the case of the fourth embodiment are generally the same as those in the case of the first embodiment.

What is claimed is:

1. A method for forming a control signal, said control signal being formed and outputted to damping force characteristic varying means for controlling a damping force characteristic of a shock absorber interposed between an unsprung mass and a sprung mass of a vehicle, said method comprising the steps of:

a) detecting a vertical acceleration acted on the sprung mass and outputting a signal indicative of the vertical acceleration of the sprung mass; and b) converting the vertical acceleration indicative signal outputted at the step a) into a signal indicative of a vertical velocity of the sprung mass using a phase compensation filter (PCF), said control signal being formed on the basis of the converted sprung mass vertical velocity indicative signal.

2. A method for forming a control signal as claimed in claim 1, wherein said phase compensation filter has the following filter equation: $(0.001S+1)/(10S+1)$, wherein S denotes a complex variable and $S=\sigma+j\omega$, $\sigma$ denoting a real number, j denoting an imaginary number unit, and $\omega$ denoting $2\pi f$, f denoting a frequency.

* * * * *